(12) United States Patent
Miller et al.

(10) Patent No.: US 10,948,722 B2
(45) Date of Patent: Mar. 16, 2021

(54) MULTI-RESOLUTION DISPLAY ASSEMBLY FOR HEAD-MOUNTED DISPLAY SYSTEMS

(71) Applicant: Magic Leap, Inc., Plantation, FL (US)

(72) Inventors: Samuel A. Miller, Hollywood, FL (US); William Hudson Welch, Fort Lauderdale, FL (US); Lionel Ernest Edwin, Plantation, FL (US); Ivan Li Chuen Yeoh, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/815,443

(22) Filed: Nov. 16, 2017

(65) Prior Publication Data

US 2018/0136471 A1     May 17, 2018

Related U.S. Application Data

(60) Provisional application No. 62/423,162, filed on Nov. 16, 2016, provisional application No. 62/475,012, (Continued)

(51) Int. Cl.
*G02B 27/01*     (2006.01)
*G09G 3/00*     (2006.01)
(Continued)

(52) U.S. Cl.
CPC ..... *G02B 27/0172* (2013.01); *G02B 27/0081* (2013.01); *G02B 27/0093* (2013.01);
(Continued)

(58) Field of Classification Search
CPC . G02B 27/017; G02B 2027/014; G06F 3/011; G06F 3/017; G06F 3/013;
(Continued)

(56) References Cited

U.S. PATENT DOCUMENTS 8,941,559 B2    1/2015    Bar-Zeev et al.
9,671,566 B2    6/2017    Abovitz et al.
(Continued)

FOREIGN PATENT DOCUMENTS

WO     2013188690 A2    12/2013

OTHER PUBLICATIONS

PCT/US2017/062070, International Search Report and Written Opinion, Mar. 23, 2018, 9 pages.
(Continued)

*Primary Examiner* — Ming Wu
(74) *Attorney, Agent, or Firm* — Kilpatrick Townsend & Stockton LLP

(57) ABSTRACT

This disclosure describes a head-mounted display with a display assembly configured to display content to most or all of a user's field of view. The display assembly can be configured to display content in far-peripheral regions of the user's field of view differently than content upon which a user can focus. For example, spatial resolution, color resolution, refresh rate and intensity (i.e. brightness) can be adjusted to save resources and/or to bring attention to virtual content positioned within a far-peripheral region. In some embodiments, these changes can save processing resources without detracting from the user's overall experience.

17 Claims, 25 Drawing Sheets

Related U.S. Application Data filed on Mar. 22, 2017, provisional application No. 62/539,934, filed on Aug. 1, 2017.

(51) Int. Cl.

| | | |
|---|---|---|
| *G02B 27/00* | (2006.01) | |
| *G03B 21/10* | (2006.01) | |
| *G09G 3/3208* | (2016.01) | |

(52) U.S. Cl.
CPC ....... *G02B 27/017* (2013.01); *G02B 27/0189* (2013.01); *G03B 21/10* (2013.01); *G09G 3/003* (2013.01); *G09G 3/3208* (2013.01); *G02B 2027/014* (2013.01); *G02B 2027/0123* (2013.01); *G02B 2027/0138* (2013.01); *G02B 2027/0178* (2013.01)

(58) Field of Classification Search
CPC .. H04N 13/344; H04N 13/239; G06K 9/0061; G06K 9/00671; G06K 9/52; G06K 9/00214; G06K 9/00335; G06K 9/00355; G06K 9/00577; G06K 9/00604; G06K 9/00664; G06K 9/222; G06K 9/4604; G09B 9/307; H04S 2400/11; H04S 2400/15; H04S 7/304
See application file for complete search history.

(56) References Cited

U.S. PATENT DOCUMENTS

| | | | |
|---|---|---|---|
| 9,791,700 B2 | 10/2017 | Schowengerdt | |
| 2008/0212272 A1* | 9/2008 | Hollander | G06F 1/1613 |
| | | | 361/729 |
| 2010/0149073 A1 | 6/2010 | Chaum et al. | |
| 2012/0154920 A1* | 6/2012 | Harrison | G02B 27/017 |
| | | | 359/619 |
| 2013/0285886 A1* | 10/2013 | Pombo | G02B 27/0176 |
| | | | 345/8 |
| 2013/0342813 A1* | 12/2013 | Wang | G02B 30/35 |
| | | | 353/7 |
| 2014/0146394 A1* | 5/2014 | Tout | G02B 27/017 |
| | | | 359/630 |
| 2015/0049000 A1* | 2/2015 | He | G02B 27/017 |
| | | | 345/1.3 |
| 2015/0219902 A1* | 8/2015 | Kim | G02B 27/0172 |
| | | | 345/8 |
| 2015/0301599 A1* | 10/2015 | Miller | G06F 3/011 |
| | | | 345/156 |
| 2015/0346490 A1 | 12/2015 | Tekolste et al. | |
| 2016/0037849 A1 | 2/2016 | Shearman et al. | |
| 2016/0070360 A1* | 3/2016 | Chehade | G06K 9/4604 |
| | | | 345/156 |
| 2016/0150219 A1* | 5/2016 | Gordon | G06F 3/017 |
| | | | 348/46 |
| 2016/0240013 A1* | 8/2016 | Spitzer | G02B 27/0179 |
| 2016/0327789 A1 | 11/2016 | Klug et al. | |
| 2017/0010488 A1 | 1/2017 | Klug et al. | |
| 2017/0091996 A1 | 3/2017 | Wei et al. | |
| 2017/0109936 A1 | 4/2017 | Powderly et al. | |
| 2017/0315612 A1* | 11/2017 | Shanware | G02B 27/0176 |

OTHER PUBLICATIONS

PCT/US2017/062070, "Invitation to Pay Additional Fees and Partial Search Report", Jan. 22, 2018, 2 pages.
EP17872836.6, "Extended European Search Report", Nov. 15, 2019, 8 pages.
PCT/US2017/062070, "International Preliminary Report on Patentability", May 31, 2019, 7 pages.

\* cited by examiner

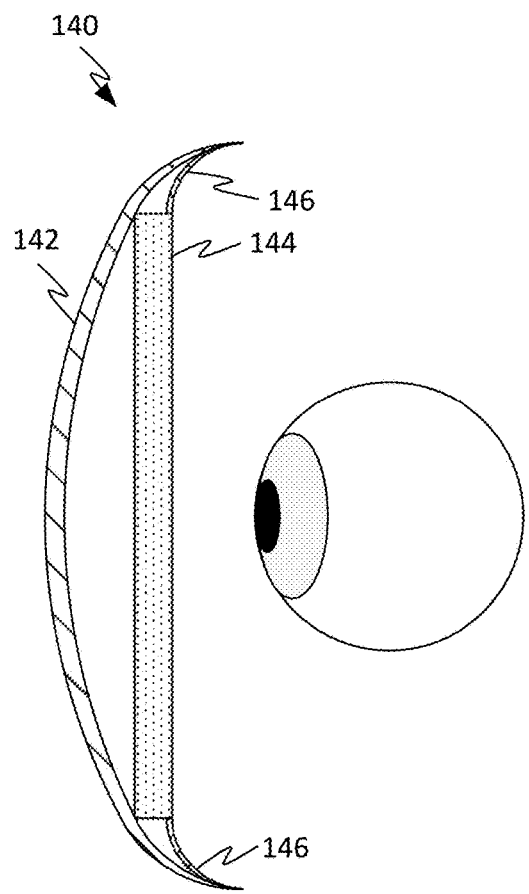
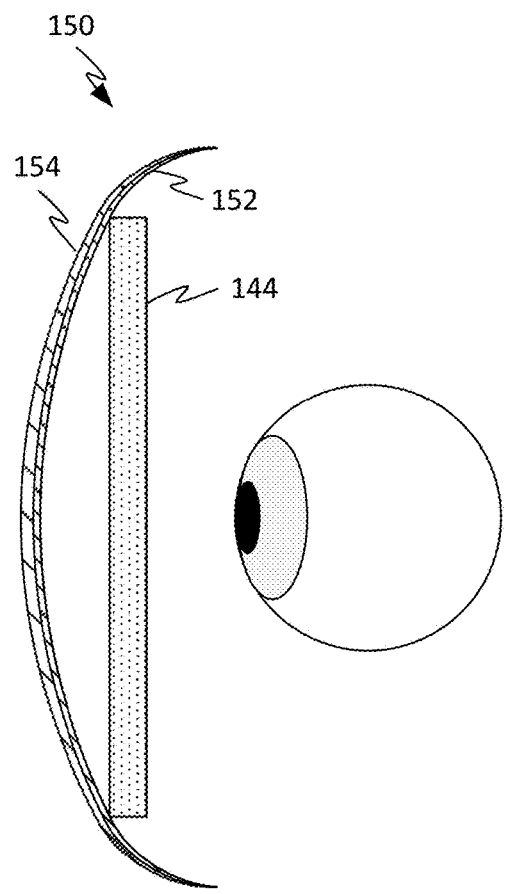
FIG. 1H                    FIG. 1I

MULTI-RESOLUTION DISPLAY ASSEMBLY FOR HEAD-MOUNTED DISPLAY SYSTEMS

CROSS-REFERENCE TO RELATED APPLICATIONS

This application claims priority to U.S. Provisional Patent Application No. 62/423,162, filed on Nov. 16, 2016 and entitled "Multi-Resolution Display Assembly for Head-Mounted Display Systems," U.S. Patent Provisional Application No. 62/475,012, filed on Mar. 22, 2017 and entitled "High Resolution High Field of View Display" and U.S. Provisional Patent Application No. 62/539,934, filed on Aug. 1, 2017, and entitled "High Resolution High Field of View Display". The disclosures of these applications is hereby incorporated by reference in its entirety for all purposes.

This application is related to the following patent applications: Ser. No. 14/707,000 by Miller et al, entitled "Eye Tracking Systems and Method for Augmented or Virtual Reality"; Ser. No. 14/555,585 by Schowengerdt et. al, entitled "Virtual and Augmented Reality Systems and Methods"; and Ser. No. 15/182,511 by Klug et al, entitled "Virtual and Augmented Reality Systems and Methods", which are all incorporated by reference herein in their entirety and for all purposes.

BACKGROUND OF THE INVENTION

Virtual and augmented reality systems generally include displays that project light into the eyes of a user. Unfortunately, these systems are not designed to project content along the outer periphery of a user's field of view or beyond a small central portion of the user's field of view, due to output-angle limitations of available display technologies. This can reduce the level of immersion felt by a user of these systems that might otherwise be possible when content is delivered from angles extending all the way to an outer periphery of a user's field of view. For this reasons, mechanisms for stimulating the outer periphery of a user's field of view are desirable.

SUMMARY OF THE INVENTION

This disclosure describes a wearable device configured to present immersive virtual, augmented and mixed reality content to a user. In an embodiment, a head-mounted display with a wraparound display assembly is provided that is configured to display content to most or all of a user's field of view. The display assembly can be configured to display content in far-peripheral regions of the user's field of view differently than content upon which a user can focus. For example, spatial or angular resolution, color resolution, refresh rate and intensity (i.e. brightness) can be adjusted to save resources and/or to bring attention to virtual content positioned within a far-peripheral region. In some embodiments, these changes can save processing resources without detracting from the user's overall experience.

This disclosure describes a head-mounted display assembly that includes the following: a first display; a second display at least partially surrounding the first display; and an attachment member configured to couple the first and second displays to the head of a user. The second display has a larger curvature than the first display.

A wearable display device is disclosed and includes the following: a frame including an attachment member configured to secure the display device to the head of a user; and a display assembly coupled to the frame, the display assembly comprising: a main display, and a peripheral display arranged along a periphery of the main display.

A display of a head-mounted display device is disclosed. The display includes the following: a first region having a first resolution; a second region at least partially surrounding the first region and having a second resolution substantially lower than the first resolution; and a transition region between the first region and the second region having a variable resolution that is lower on the side of the transition region adjacent to the first region than the side of the transition region adjacent the second region.

Numerous benefits are achieved by way of the present invention over conventional techniques. For example, embodiments of the present invention provide a superior immersive experience over head-mounted displays not targeting the far-peripheral regions of a user's field of view. Furthermore, a lower cost peripheral display can be used to cover the far-peripheral regions since the human eye is less capable of discerning high-resolution spatial and color imagery in peripheral regions of the user's field of view. For this reason, the present invention allows for a more immersive experience without adding substantially to the overall cost of the head-mounted display.

In addition, parts of the wearable frame that would by default simply act as obstructions, can now be surfaces for light display and modulation. These previously obstructing structures can be made aesthetically pleasing or interactive. These previously obstructing structures can also be made 'invisible' to the viewer by matching the displayed content to the scene behind the structure/wearable.

These and other embodiments of the invention along with many of its advantages and features are described in more detail in conjunction with the text below and attached figures.

BRIEF DESCRIPTION OF THE DRAWINGS

The disclosure will be readily understood by the following detailed description in conjunction with the accompanying drawings, wherein like reference numerals designate like structural elements, and in which:

FIGS. 1H-1M show various main and peripheral display arrangements;

DETAILED DESCRIPTION OF SPECIFIC EMBODIMENTS

Figure 1A:
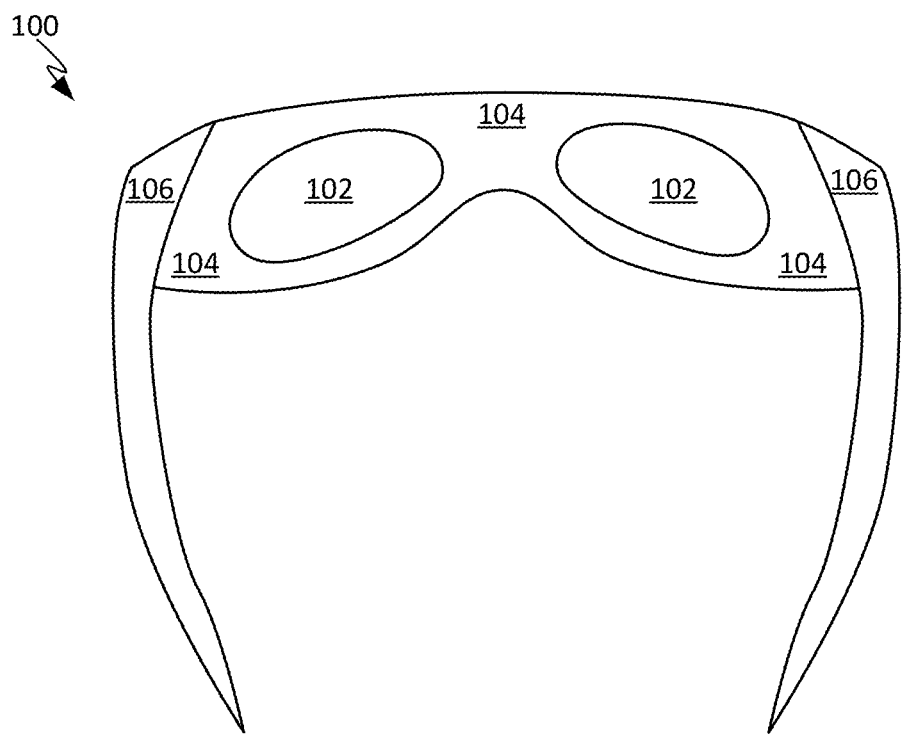
FIGS. 1A-1C show a number of different wearable display embodiments according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

Head-mounted display devices or wearable display devices can be configured to provide an immersive user experience by projecting virtual content directly into the eyes of a user. Unfortunately, the displays associated with these types of devices do not generally extend to cover the user's entire field of view. While the user's ability to focus on objects is limited to between about 30 and 50 degrees off-axis, most user's eyes are capable of detecting content and particularly fast movement past 100 degrees off-axis in some directions. For this reason, to create a truly immersive experience, a display needs to be designed to cover the outer periphery of the user's vision.

One solution to this problem is to incorporate a peripheral display for displaying content to a peripheral region of a user's field of view that falls outside of a user's field of regard. The field of regard is made up of the portion of the user's field of view upon which a user can directly focus. Because the peripheral display shows content outside of the user's field of regard, the need to seamlessly blend or transition content from the peripheral display to a main display is minimal. Furthermore, since the visual acuity of a user is substantially reduced in the peripheral region, the peripheral display can run in reduced acuity modes that save power and/or processing power. For example, the peripheral display can display content at a lower spatial or angular resolution, a lower color resolution, a different intensity and/or a lower refresh rate. In some embodiments, portions of the display may not be capable of displaying high spatial, angular and/or color resolution imagery due to, e.g. reduced pixel densities. In addition to allowing the wearable device to operate at lower power levels, these lower acuity display modes allow the hardware costs associated with the peripheral display to be substantially lower on account of the peripheral display not needing to have the ability to generate high resolution imagery at high refresh rates. In some embodiments, the peripheral display can take the form of a transparent OLED (organic light emitting diode) display. The transparent OLED can include an array of pixels distributed across a transparent and flexible substrate. In some embodiments, the substrate can be formed from a blend of polymers. In other embodiments, the peripheral display can also take the form of a pico-projector projecting content onto internal and/or external surface of the wearable display device.

Another solution involves using a customized display that covers the user's entire field of view. The customized display can be designed to display content with spatial and color resolutions that decrease towards the periphery of the display. In some embodiments, the resolution can fall off gradually towards the periphery of the display. In some embodiments, the resolution change can be based on a current position of a user's eyes. For example, if an eye-tracking sensor determines the user's eyes are focused towards one side of the display, the opposite side of the display can be configured to display a commensurately lower resolution.

These and other embodiments are discussed below with reference to FIGS. 1A-8C; however, those skilled in the art will readily appreciate that the detailed description given herein with respect to these figures is for explanatory purposes only and should not be construed as limiting.

FIG. 1A shows a wearable display device 100 that includes high-resolution main displays 102 and a lower resolution peripheral display 104 that surrounds main displays 102. In some embodiments, peripheral display 104 can be arranged to conform to an interior-facing surface of temple arms 106. It should be noted that a size of main displays 102 can be adjusted to coincide with an average field of regard for a user wearing wearable display device 100. Selecting a display technology for peripheral display 104 that includes a flexible substrate material capable of bending and flexing with temple arms 106 can allow peripheral display 104 to conform with at least a portion of the interior facing surface of temple arms 106. In some embodiments, the flexible substrate material can be flexible enough to accommodate temple arms 106 folding against the displays for storage.

Figure 1B:
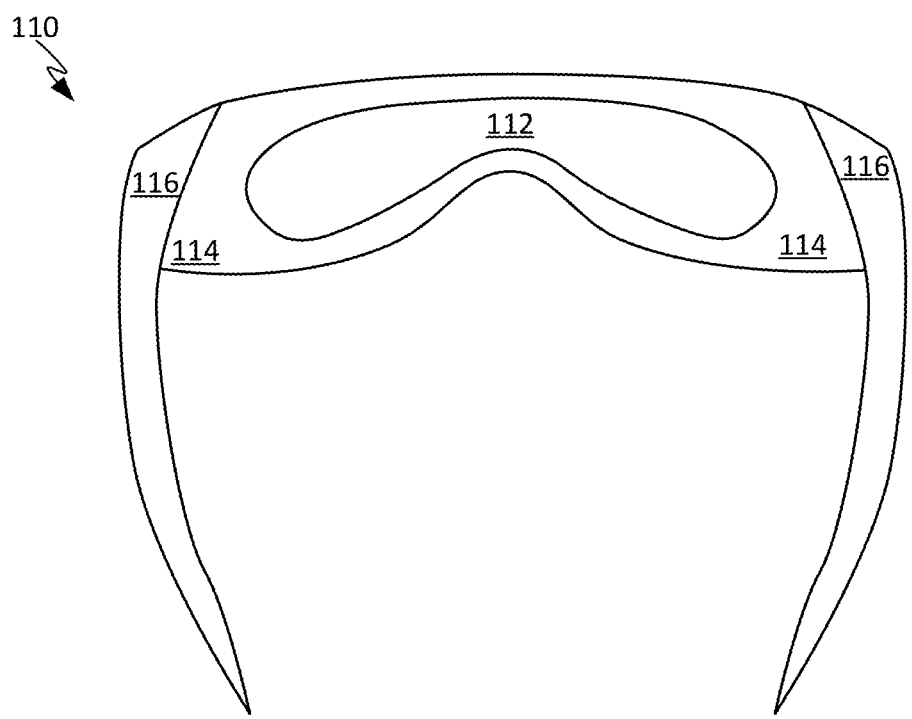

FIG. 1B shows a wearable display device 110 having a single main display 112 that covers the field of regard for both eyes of a user operating wearable display device 110. In some embodiments, main display 112 can utilize a different display technology than peripheral display 114. For example, main display 112 could take the form of a light field display device, which can include one or more waveguides configured to project light fields onto the user's retina. The output of a light field display is an angular representation of content and can be configured to project varied angular resolutions. U.S. application Ser. Nos. 14/707,000, 14/555,585, and/or 15/182,511, all provide detailed examples of light field display devices capable of user as a main display. Peripheral display 114 could take the form of a screen-based display device, which can include a "screen" on which content is displayed (e.g., LCD, OLED, projector+projection screen, CRT, etc.). The output of this type of device is a spatial representation of content as presented on a screen. Main display 112 and peripheral display 114 can be coupled to the ears of a user by temples 116.

Figure 1C:
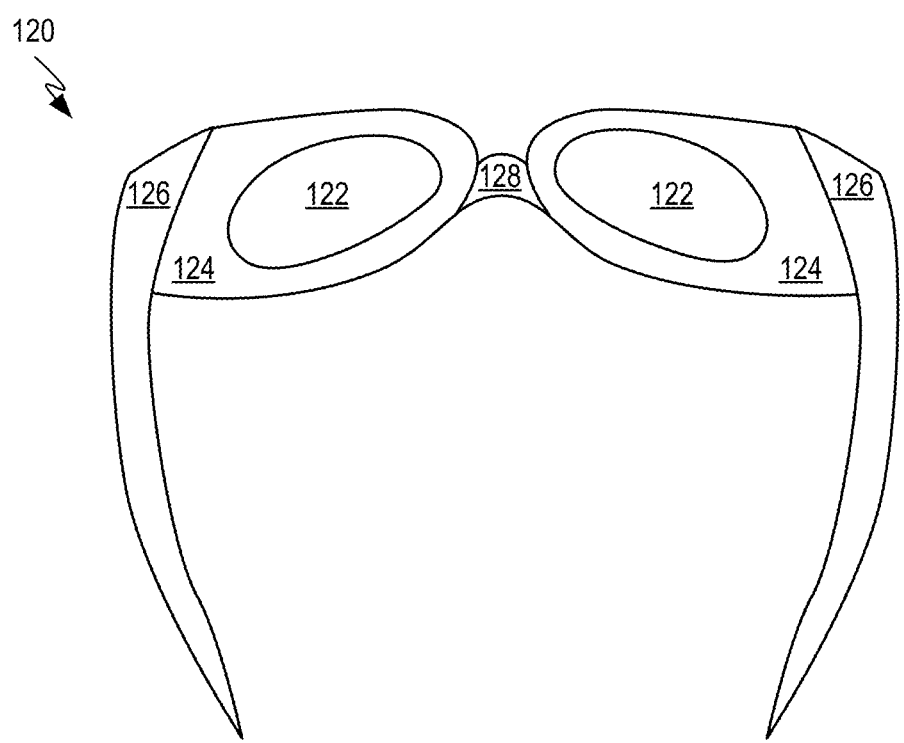

In some embodiments, both the main display(s) and peripheral display(s) can be transparent, allowing the outside world to be viewable in areas where digital content is not being actively displayed. FIG. 1C shows a wearable display device 120 having two separate main displays 122 and two separate peripheral displays 124. Main displays 122 can be configured to cooperatively cover the field of regard of the eyes of a user, while the peripheral displays 124 can cooperatively cover any portion of the field of view not covered by main displays 122. Temples 126 represent attachment members suitable for engaging the ears of a user and bridge 128 joins the two separate main displays 122 together.

Figure 1D:
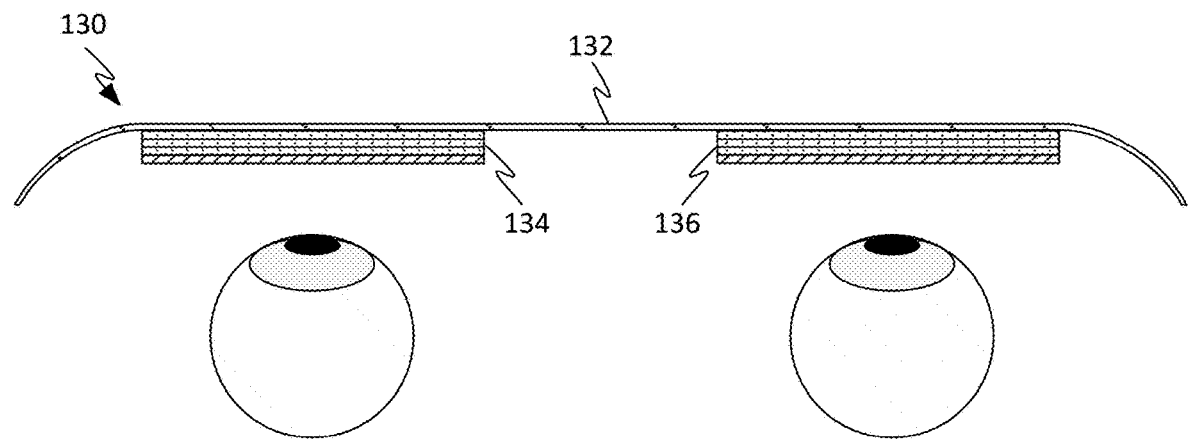
FIGS. 1D-1E show how main displays can be positioned on either an exterior-facing or interior-facing surface of a peripheral display.
Figure 1E:
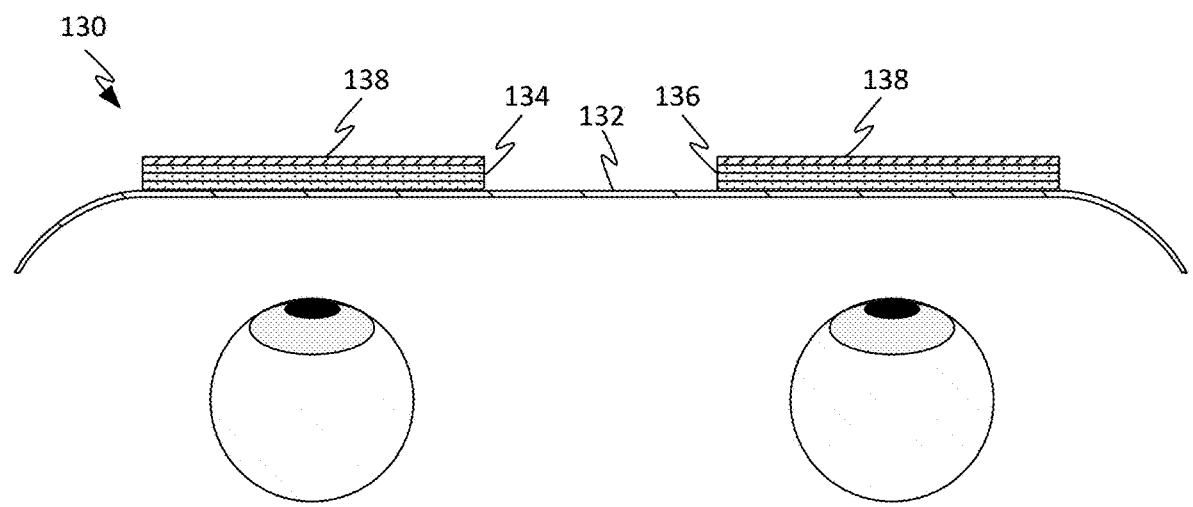

FIGS. 1D-1E show cross-sectional views of various configurations of wearable display device 130. FIG. 1D shows how a front portion of wearable display device 130 can take the form of a peripheral display device 132. In this way, peripheral display device 132 can act as a protective cover for main displays 134 and 136. Main displays 134 and 136 are depicted including multiple different layers that represent different waveguides for directing different wavelengths of light to a user. In some embodiments, the main displays 134 and 136 can be adhered or otherwise attached to a surface of the peripheral display 132. For example, such a surface of the peripheral display 132 can be a contiguous sheet or piece of material that extends beyond the perimeter of the main display 134 and the main display 136 so as to provide peripheral display functionality. Peripheral display 132 and main displays 134 and 136 can be transparent so that a user is able to perceive the outside world in addition to any virtual content generated by peripheral displays 132 and main displays 134 and 136. In some embodiments, the portions of peripheral display device 132 that overlap main displays 134 and 136 can be configured not to display content so that preventing the displays from displaying the same content. In some embodiments, peripheral display 132 can be configured to display content on startup while main displays 134 and 136 go through warm up cycles. Subsequent to initialization of main displays 134 and 136, the portions of peripheral display 132 that overlap main displays 134 and 136 could be disabled. In some embodiments, peripheral display 132 could take over for main displays 134 and 136 when interactive or high-resolution content is not being actively displayed. For example, if a user enters a configuration menu where displayed content is limited to text or simple menu structures, allowing one or more portions of peripheral display 132 that overlap main displays 134 and 136 to run in lieu of main displays 134 and 136 could help save power and reduce heat generation in embodiments where main displays 134 and 136 are more power-hungry and/or generate more heat than peripheral display 132. For example, peripheral display 132 could take the form of a flexible, transparent OLED display capable of consuming less power than main displays 134 and 136 when the main displays are driven by relatively high-energy consuming light projectors.

In some implementations, some or all portions of the peripheral display 132 can be operated to present content in tandem with the main displays 134 and 136 for further user experience enhancement. For example, portions of the peripheral display 132 that are attached to or otherwise overlapping the main displays 134 and 136 could present a flash of white light while the main displays 134 and 136 present virtual content resembling fire/flames so as to simulate an explosion for a user engaged in a mixed reality gameplay experience. In another example, portions of the peripheral display that are attached to or otherwise overlapping the main displays 134 and 136 could present text and/or serve to highlight real world objects within a user's field of view. Moreover, by utilizing portions of the peripheral display 132 that are attached to or otherwise overlapping the main displays 134 and 136 as well as portions of the peripheral display 132 that are not attached to the main displays 134 and 136 (e.g., regions of the peripheral display 132 between and/or surrounding the outer perimeters of main displays 134 and 136), the boundaries between the two types of display devices may be appear smoother to users. In some examples, some or all of the functionality of portions of the peripheral display 132 that are attached to or otherwise overlapping the main displays 134 and 136, as described herein with reference to FIG. 1D, may also extend to portions of peripheral displays overlapping one or more main displays (relative to a user's field of view) as described in further detail below with reference to FIGS. 1I and 1K-1M.

FIG. 1E shows wearable display device 130 with an alternative configuration in which main displays can be positioned forward of peripheral display 132. In such a configuration, main displays 134 and 136 can include a protective cover layer 138 that protects main displays 134 and 136 from damage. Wearable display device 140 can be operated in a similar manner to wearable display device 130, allowing the peripheral display 132 to takeover operation from main displays 134 and 136 in certain situations.

Figure 1F:
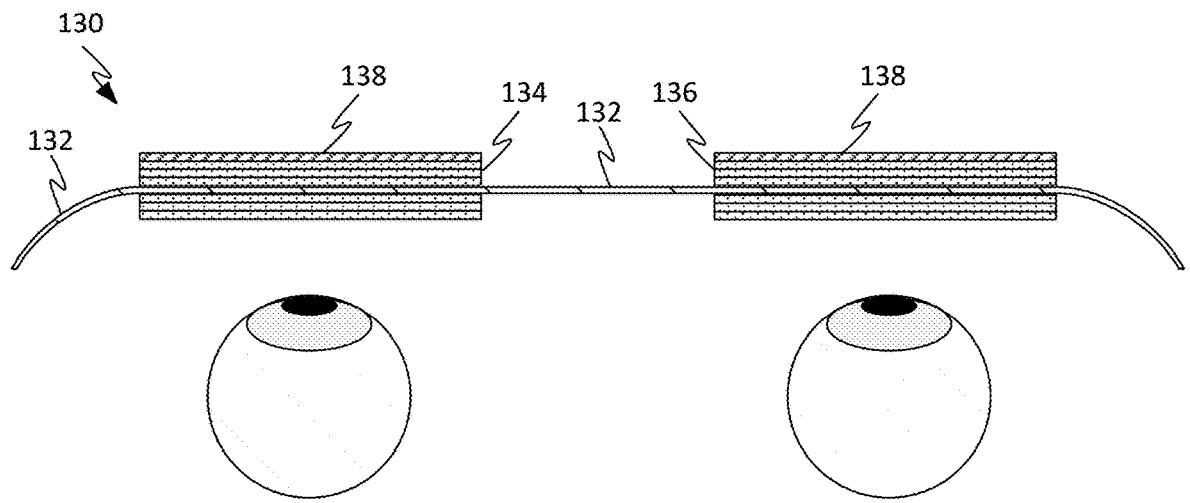
FIG. 1F show how a peripheral display can extend between waveguides of one or more main displays.

Similarly, in some embodiments and as shown in FIG. 1F, the peripheral display could extend through a central portion of main displays 134 and 136. In some embodiments, peripheral display 132 can act as a spacer to accentuate a distance between a first portion of the display and a second portion of the display. This distance can help light emitted from a portion of the main displays on an exterior facing surface of the peripheral display appear to originate from a farther away than the portion positioned along an interior facing surface of the peripheral display.

Figure 1G:
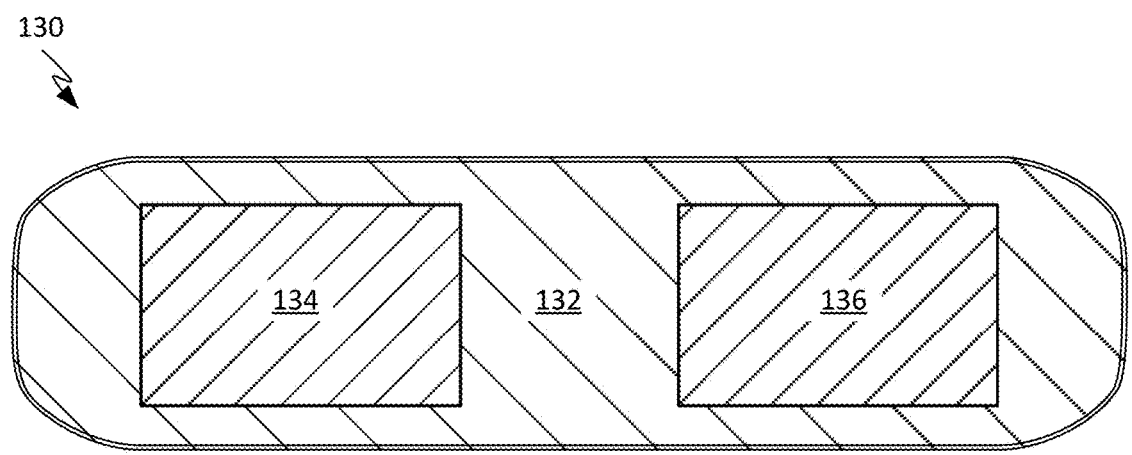
FIG. 1G shows how a peripheral display can surround two main displays.

FIG. 1G shows a front view of wearable display device 130. The front view of wearable display device 130 demonstrates how peripheral display 132 is able to border and surround both of main displays 134 and 136. In some embodiments, a periphery of main displays 134 and 136 can have reduced spatial, angular and/or color resolution in order to blend with lower resolution data being displayed on peripheral display 132. U.S. provisional patent applications 62/475,012 and 62/539,934 both entitled "High Resolution High Field of View Display", to which this application claims priority, describe various ways in which the resolution of a projection-based display system can be configured with a varying angular resolution.

Figure 1J:
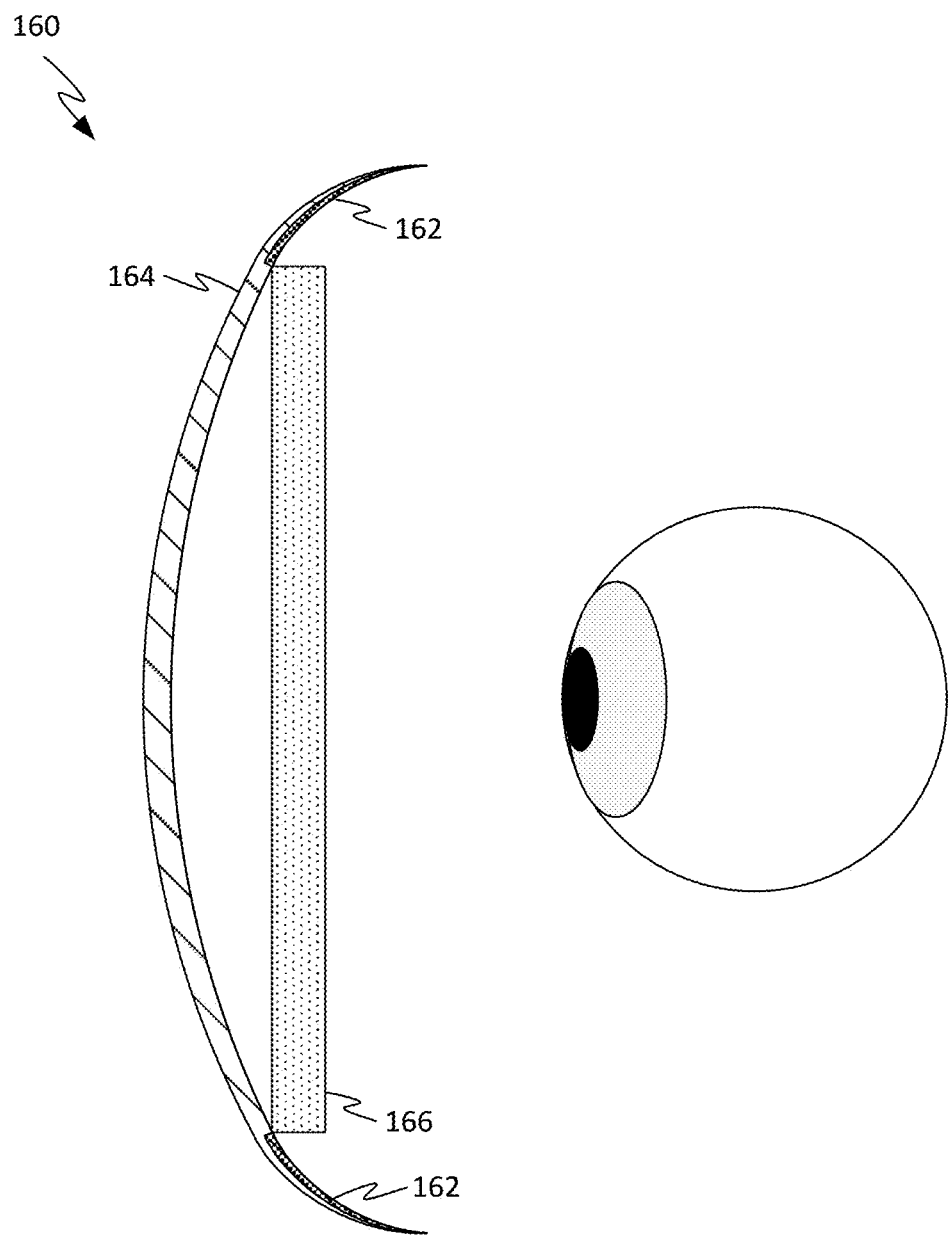

FIGS. 1H-1K show side views of various wearable display devices 140, 150 and 160. Wearable display device 140 includes a visor component 142, which provides a rigid substrate to which main display 144 and peripheral display 146 can be coupled. While visor component can be optically neutral, it can also be configured to create a slight magnification or reduction of objects within the field of view of the visor. In some embodiments, visor could include a polarizing layer and/or tinted layer, which could be helpful during outside use. Peripheral display 146 can extend from an edge of visor component 152 to a periphery of main display 154. The displays can be affixed to one another in many ways. For example, peripheral display 156 can be adhesively coupled to main display 154. In some embodiments, an optically transparent frame can be positioned between visor component 152 and peripheral display 156 to help maintain a shape of peripheral display 156. FIG. 1I shows how a peripheral display 152 can be adhered to an interior-facing surface of visor component 154. In this way, visor component 154 can be configured to set a shape and position of peripheral display 162. FIG. 1J shows wearable display device 160 and how peripheral display 162 can be adhered to a peripheral portion of visor component 164. In some embodiments, peripheral display 162 can be affixed to a recessed region defined by visor component 164. In this way, peripheral display 162 need only be sized to fill a portion of a user's field of view extending outside of main display 166.

Figure 1K:
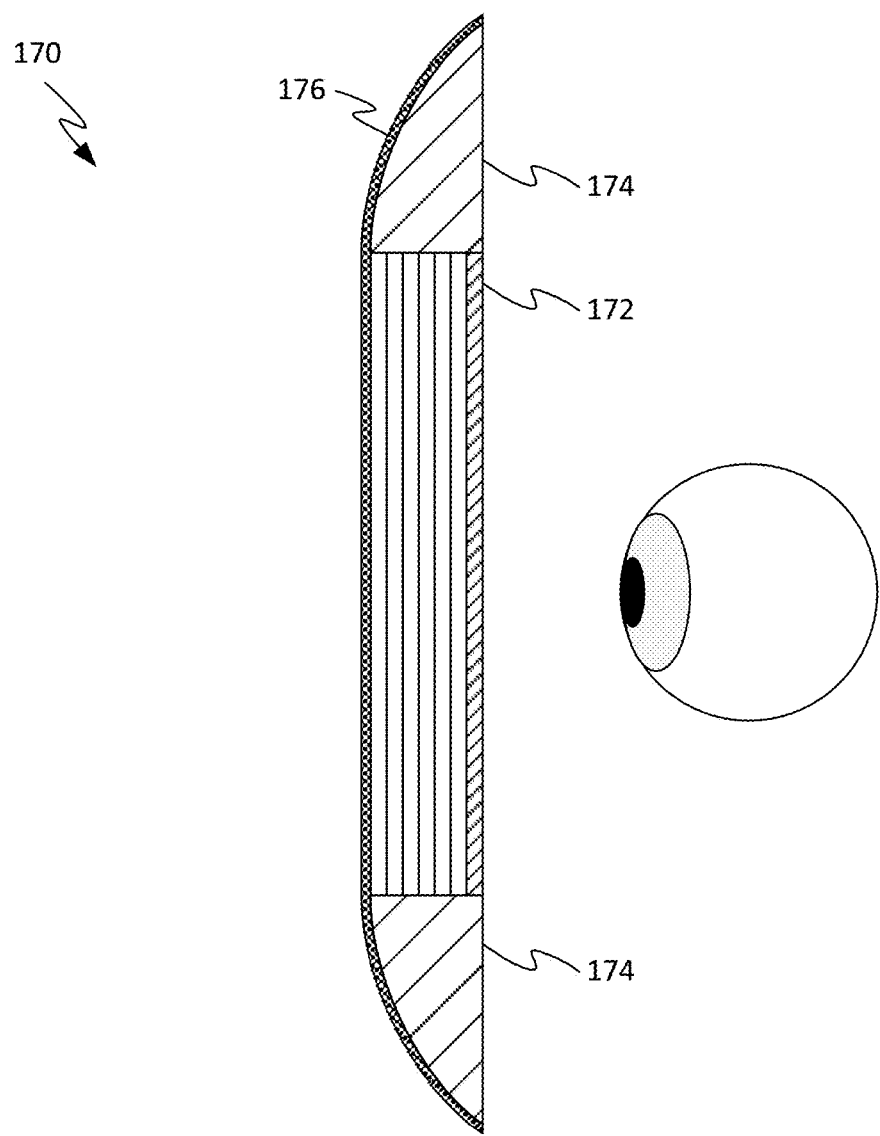

FIG. 1K shows a cross-sectional side view of wearable display device 170 and how main display 172 can be surrounded by a transparent curved optical element 174 that supports a periphery of peripheral display 176. In some embodiments, an index of refraction of curved optical element 174 can be tuned to minimize distortion of light emitted by peripheral display 176. In some embodiments, the transparent curved optical element 174 can take the form of a transparent frame that used to support and position various other components associated with wearable display device 170. For example, in some embodiments, waveguides configured to transmit light into main display 172 can extend through an opening or channel defined by transparent curved optical element 174.

Figure 1L:
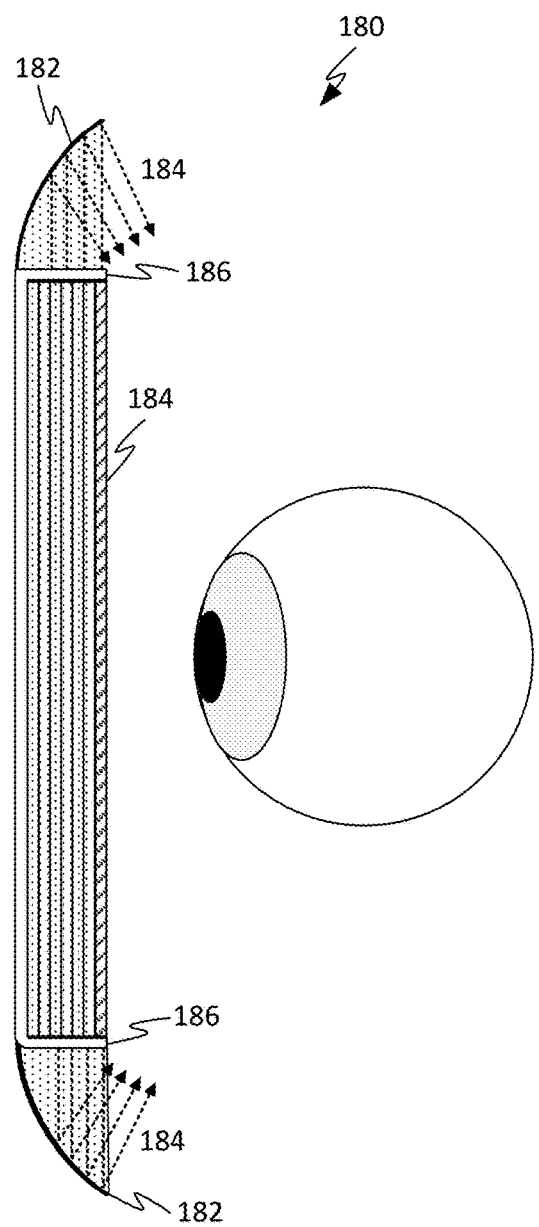
Figure 1M:
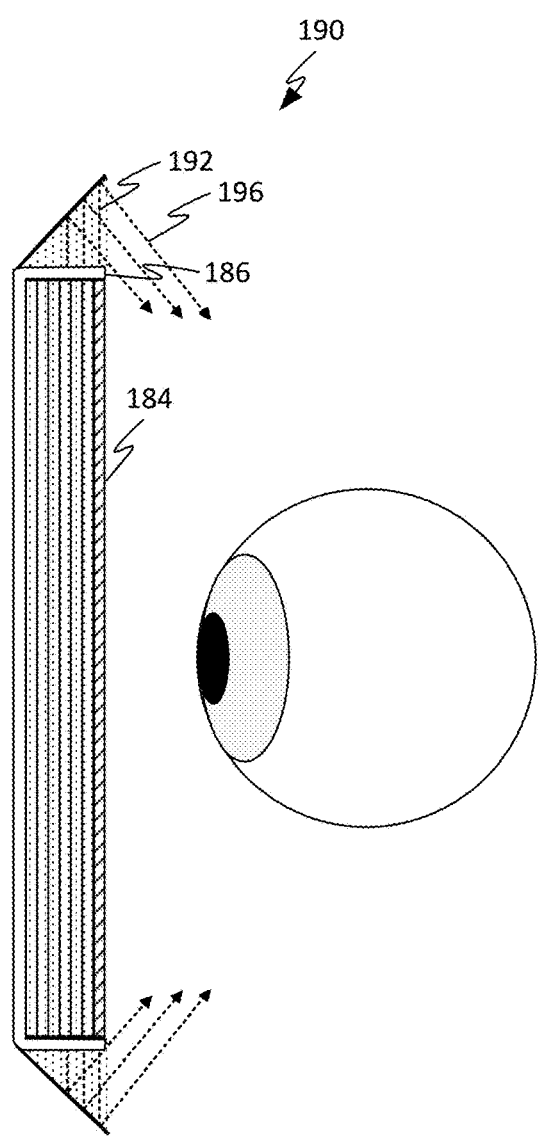

FIGS. 1L-1M show how peripheral displays can be wrapped around the edges of a main display device and utilize various optics to direct light emitted from the peripheral displays toward reflectors that reorient the light back into the eyes of a user of the wearable display device. FIG. 1L shows freeform optic 182 surrounding main display 184. Freeform optic 182 can include an at least partially reflective surface 182 configured to redirect light 184 emitted by peripheral display 186 back toward a user's eye. In this way, freeform optic 182 is able to expand an effective size of the active display of wearable display device 180 without the need for extending a peripheral display out to an extreme end of the device. An alternative embodiment is depicted by wearable display device 190, which can instead include a prism 192 having a triangular cross-section arranged along the periphery of main display 194. Prism 192 can redirect light 196 emitted by peripheral display 186 that wraps around the edges of main display 184.

Figure 2A:
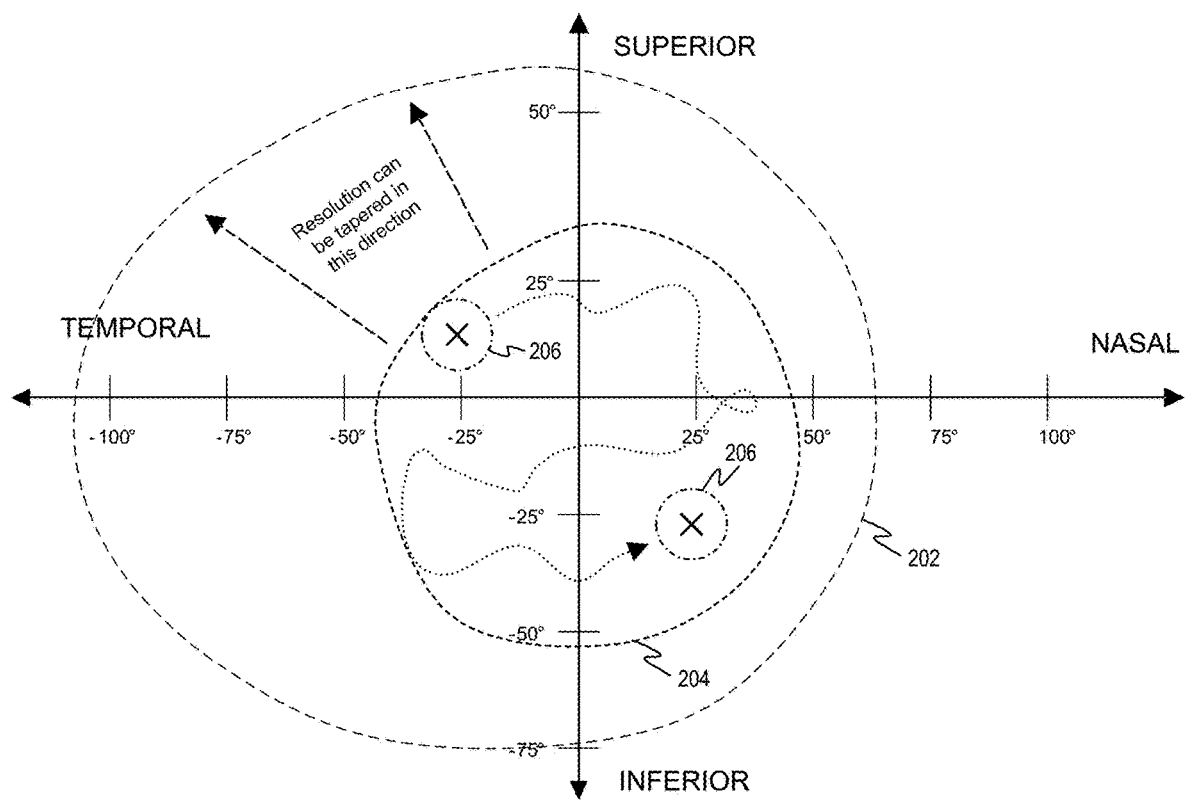
FIG. 2A shows an exemplary monocular field of view for an eye of a human being.

FIG. 2A shows a visual field diagram depicting the outer perimeter of an exemplary monocular field of view 202 for a human eye in two-dimensional angular space. As shown in FIG. 2A, temporal-nasal and inferior-superior axes of the visual field diagram serve to define the two-dimensional angular space within which the outer perimeter of the monocular field of view 202 is mapped. In this way, the visual field diagram of FIG. 2A may be seen as being equivalent or similar to a "Goldmann" visual field map or plot for a human eye. As indicated by the depicted arrangement of the temporal-nasal and inferior-superior axes, the visual field diagram shown in FIG. 2A represents a visual field diagram for the left eye of a human. While field of view can vary slightly from person to person, the depicted field of view is close to what many humans are capable of viewing with their left eye. It follows that a visual field diagram depicting the outer perimeter of an exemplary monocular field of view of the right eye might resemble something of a version of the visual field diagram of FIG. 2A in which the temporal nasal axis and the outer perimeter of the monocular field of view 202 have been mirrored about the inferior-superior axis. The visual field diagram of FIG. 2A further depicts the outer perimeter of an exemplary field of regard 204 for the human eye, which represents a portion of the monocular field of view 202 in angular space within which the person can fixate. In addition, the visual field diagram of FIG. 2A also depicts the outer perimeter of an exemplary foveal field 206 for the human eye, which represents a portion of the monocular field of view 202 in angular space in direct view of the fovea of the human eye at a given point in time. As depicted, a person's foveal field 206 can move anywhere within field of regard 204. Portions of the monocular field of view 202 outside of foveal field 206 in angular space can be referred herein as the peripheral region of the person's field of view. Because of the ability of human eyes to distinguish a high level of detail outside of the foveal field 206 is quite limited, displaying reduced resolution imagery outside of the foveal field 206 is unlikely to be noticed and can allow for substantial savings on power expenditure for processing components responsible for generating content for the display.

Figure 2B:
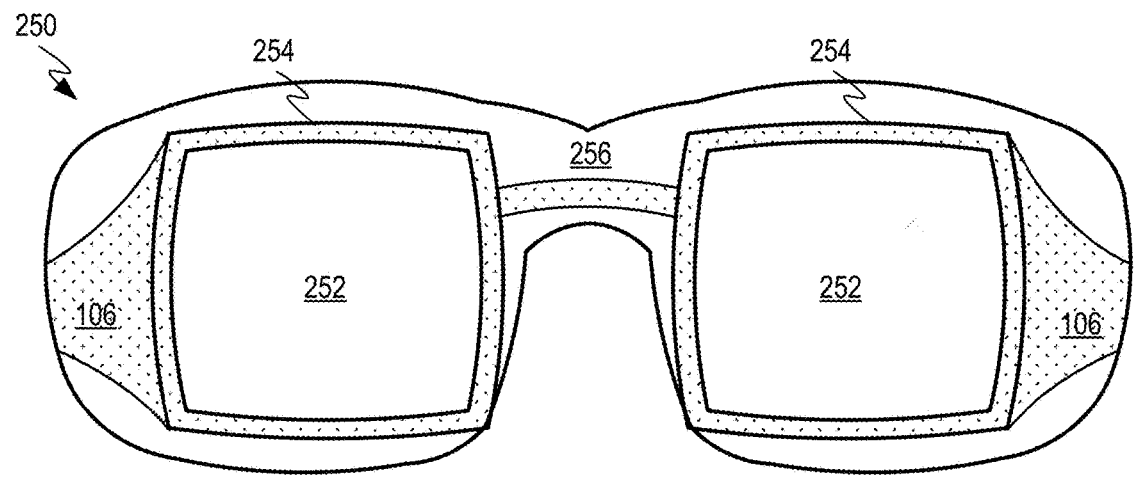
FIG. 2B shows an exemplary wearable display device configured to provide virtual content across an area suitable for covering the field of view of a user according to some embodiments.

FIG. 2B shows an exemplary wearable display device 250 configured to provide virtual content across an area suitable for covering the field of view of a user as depicted in FIG. 2A. Wearable display device 250 includes main displays 252 supported by frame 254. Frame 254 can be attached to the head of a user using an attachment member taking the form of temple arms 106. In some embodiments, the image quality displayed by wearable display device 250 can be gradually reduced in either or both of main displays 252 and peripheral display 256 so that areas near and within the field of regard have a higher quality (e.g. higher spatial and/or color resolution) than areas near the edge of main display 252. In some embodiments, the periphery of main displays 252 can be configured to match a quality or imagery characteristic of peripheral display 256. In some embodiments, the reduction in image quality can be accomplished by changing the spatial resolution, color bit depth and/or refresh rate of main display 252. For example, the color bit depth could be reduced from 12 bits to 5 or 6 bits to reduce both the requisite processing power and peripheral display complexity. In some embodiments, the color bit depth can be reduced so that only grayscale or black and white content is displayed.

Figure 2C:
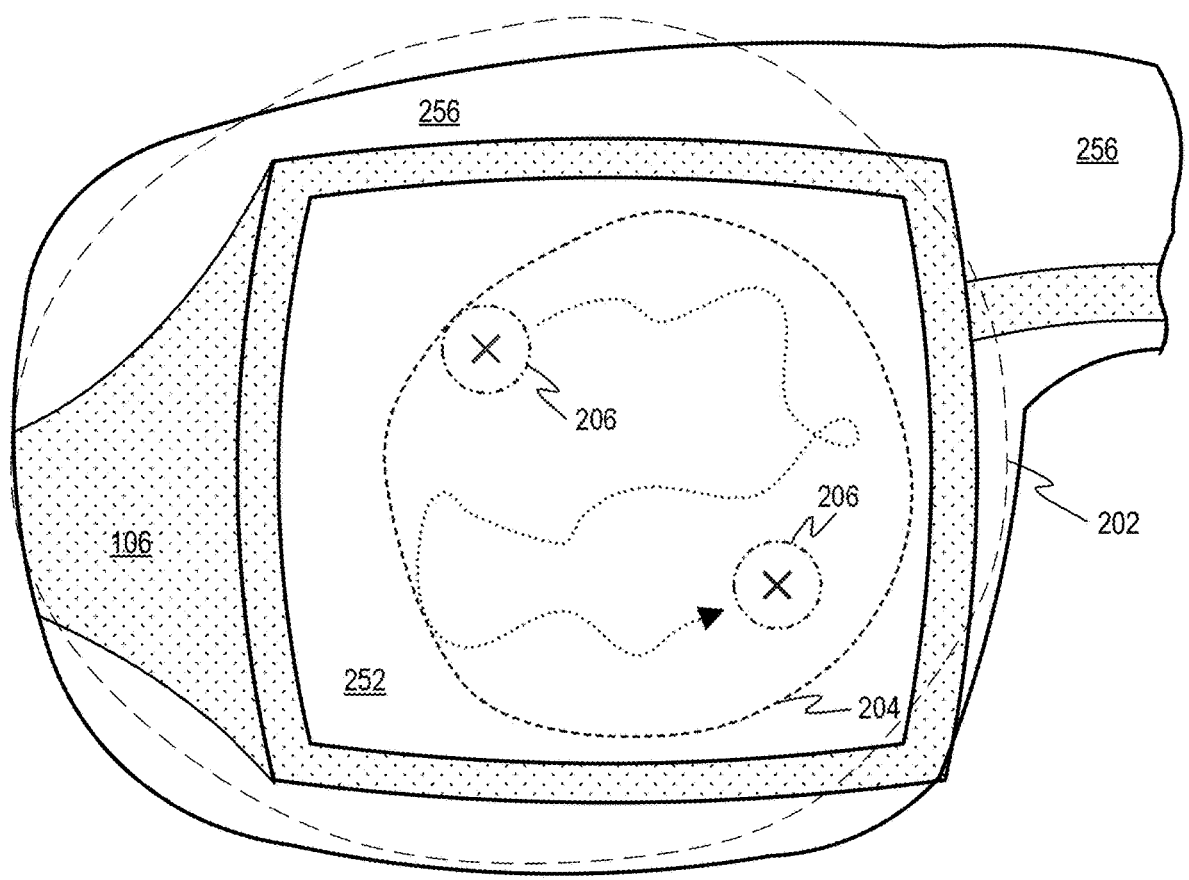
FIG. 2C shows a field of view and a field of regard overlaid upon one of the main displays depicted in FIG. 2B.

FIG. 2C shows field of view 202 and field of regard 204 overlaid upon one of main displays 252. FIG. 2C shows how main display 252 can cover field of regard 204 and in cooperation with peripheral display 256 cover a majority of field of view 202 for a user of wearable display device 250. While main display 252 is shown covering all of field of regard 204, the periphery of main display 252 can be configured to optimize system resources by reducing the resolution of any portion of main display 252 not actively covering field of regard 204. In some embodiments, sensors associated with wearable display device 250 can be configured to identify the position of the wearable display with the eyes of a user of the wearable display in order to identify regions of main display 252 not presenting content within field of regard 204. Since eye position can vary due to the shape of a head of a user of wearable display device 250, an oversized main display 252 can be helpful in allowing main display 252 to cover the full field of regard for a broad cross-section of users. In some embodiments, a registration mechanism can also help to ensure proper eye-display positioning. For example, the registration mechanism can take the form of adjustable nose-pieces and temples that can be used to accommodate differing facial features by confirming a user's field of regard is covered by main display 252 and the user's peripheral field of view is substantially covered by peripheral display 256. To help in achieving this alignment, peripheral display 256 can have an asymmetric shape configured to conform with a shape of a user's peripheral field of view 204, as depicted. In some embodiments, a user's ability to observe real-world content surrounding wearable display device within 204 can be obstructed by components supporting the operation of the wearable display device. Peripheral display 256 can be configured to overlay content on those portions of the peripheral display that overlay the obstructing components. In some embodiments, real-world content can be displayed along the interior facing surface of temples 106 utilizing imagery obtained from world cameras arranged along the exterior-facing surface of temples 106.

Figure 2D:
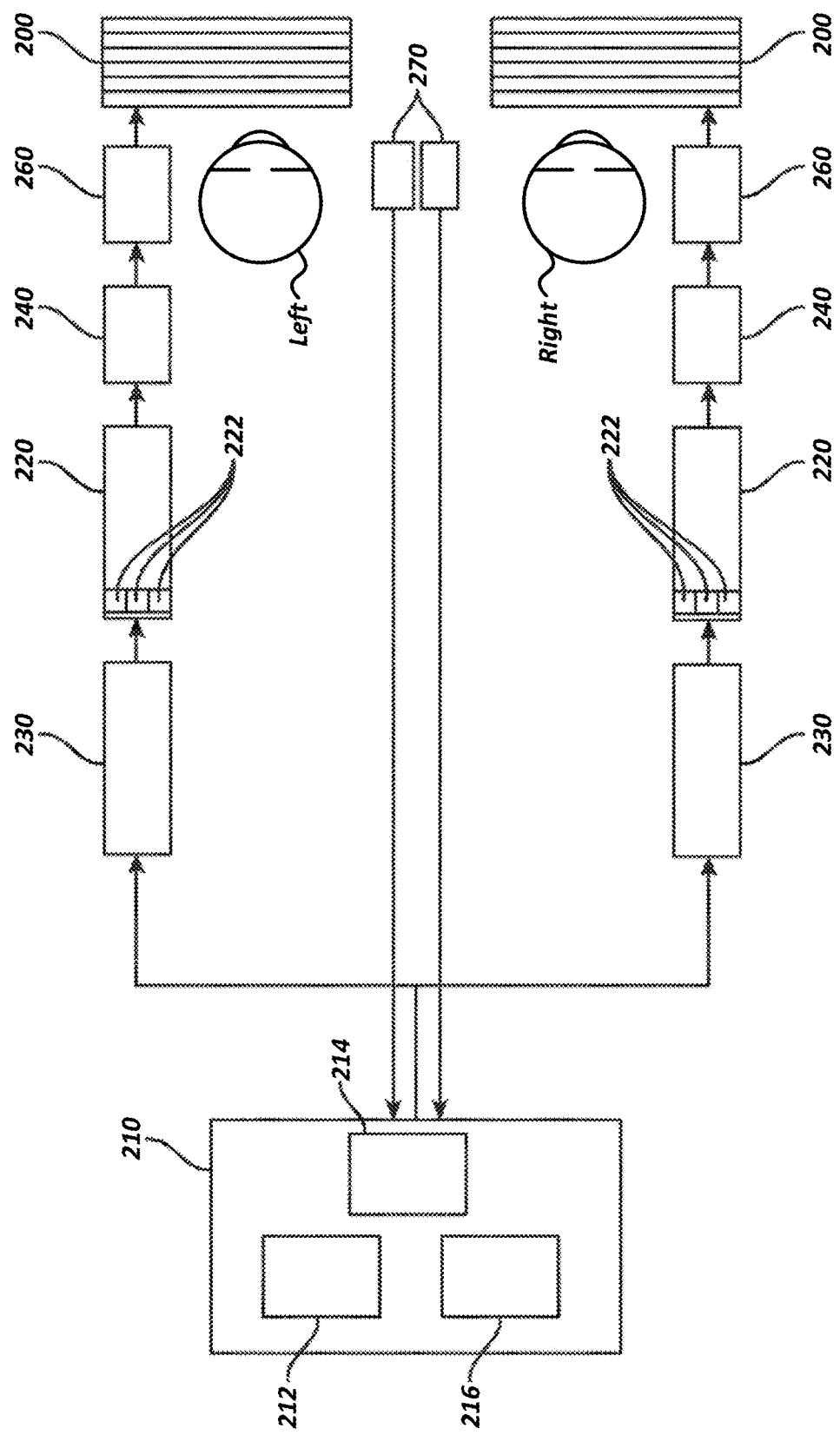
FIG. 2D, shows an exemplary embodiment of an augmented reality system configured to provide virtual content to a user.

Referring now to FIG. 2D, an exemplary embodiment of an AR system configured to provide virtual content to a user will now be described. In some embodiments, the AR system of FIG. 2D may represent a system to which the wearable display device 250 of FIG. 2B belongs. The AR system of FIG. 2D uses stacked light-guiding optical element assemblies 200 and generally includes an image generating processor 210, a light source 220, a controller 230, a spatial light modulator ("SLM") 240, an injection optical system 260, and at least one set of stacked eyepiece layers or light guiding optical elements ("LOEs"; e.g., a planar waveguide) 200 that functions as a multiple plane focus system. The system may also include an eye-tracking subsystem 270. It should be appreciated that other embodiments may have multiple sets of stacked LOEs 200, but the following disclosure will focus on the exemplary embodiment of FIG. 2D.

The image generating processor 210 is configured to generate virtual content to be displayed to the user. The image generating processor may convert an image or video associated with the virtual content to a format that can be projected to the user in 3-D. For example, in generating 3-D content, the virtual content may need to be formatted such that portions of a particular image are displayed at a particular depth plane while others are displayed at other depth planes. In one embodiment, all of the image may be generated at a particular depth plane. In another embodiment, the image generating processor may be programmed to provide slightly different images to the right and left eyes such that when viewed together, the virtual content appears coherent and comfortable to the user's eyes.

The image generating processor 210 may further include a memory 212, a GPU 214, a CPU 216, and other circuitry for image generation and processing. The image generating processor 210 may be programmed with the desired virtual content to be presented to the user of the AR system of FIG. 2D. It should be appreciated that in some embodiments, the image generating processor 210 may be housed in the wearable AR system. In other embodiments, the image generating processor 210 and other circuitry may be housed in a belt pack that is coupled to the wearable optics. The image generating processor 210 is operatively coupled to the light source 220 which projects the light associated with the desired virtual content and one or more spatial light modulators (described below).

The light source 220 is compact and has high resolution. The light source 220 includes a plurality of spatially separated sub-light sources 222 that are operatively coupled to a controller 230 (described below). For instance, the light source 220 may include color specific LEDs and lasers disposed in various geometric configurations. Alternatively, the light source 220 may include LEDs or lasers of like color, each one linked to a specific region of the field of view of the display. In another embodiment, the light source 220 may comprise a broad-area emitter such as an incandescent or fluorescent lamp with a mask overlay for segmentation of emission areas and positions. Although the sub-light sources 222 are directly connected to the AR system of FIG. 2D in FIG. 2D, the sub-light sources 222 may be connected to system via optical fibers (not shown), as long as the distal ends of the optical fibers (away from the sub-light sources 222) are spatially separated from each other. The system may also include condenser (not shown) configured to collimate the light from the light source 220.

The SLM 240 may be reflective (e.g., a DLP DMD, a MEMS mirror system, an LCOS, or an FLCOS), transmissive (e.g., an LCD) or emissive (e.g. an FSD or an OLED) in various exemplary embodiments. The type of spatial light modulator (e.g., speed, size, etc.) can be selected to improve the creation of the 3-D perception. While DLP DMDs operating at higher refresh rates may be easily incorporated into stationary AR systems, wearable AR systems typically use DLPs of smaller size and power. The power of the DLP changes how 3-D depth planes/focal planes are created. The image generating processor 210 is operatively coupled to the SLM 240, which encodes the light from the light source 220 with the desired virtual content. Light from the light source 220 may be encoded with the image information when it reflects off of, emits from, or passes through the SLM 240.

Referring back to FIG. 2D, the AR system also includes an injection optical system 260 configured to direct the light from the light source 220 (i.e., the plurality of spatially separated sub-light sources 222) and the SLM 240 to the LOE assembly 200. The injection optical system 260 may include one or more lenses that are configured to direct the light into the LOE assembly 200. The injection optical system 260 is configured to form spatially separated and distinct pupils (at respective focal points of the beams exiting from the injection optical system 260) adjacent the LOEs 200 corresponding to spatially separated and distinct beams from the sub-light sources 222 of the light source 220. The injection optical system 260 is configured such that the pupils are spatially displaced from each other. In some embodiments, the injection optical system 260 is configured to spatially displace the beams in the X and Y directions only. In such embodiments, the pupils are formed in one X, Y plane. In other embodiments, the injection optical system 260 is configured to spatially displace the beams in the X, Y and Z directions.

Spatial separation of light beams forms distinct beams and pupils, which allows placement of in-coupling gratings in distinct beam paths, so that each in-coupling grating is mostly addressed (e.g., intersected or impinged) by only one distinct beam (or group of beams). This, in turn, facilitates entry of the spatially separated light beams into respective LOEs 200 of the LOE assembly 200, while minimizing entry of other light beams from other sub-light sources 222 of the plurality (i.e., cross-talk). A light beam from a particular sub-light source 222 enters a respective LOE 200 through an in-coupling grating (not shown) thereon. The in-coupling gratings of respective LOEs 200 are configured to interact with the spatially separated light beams from the plurality of sub-light sources 222 such that each spatially separated light beam only intersects with the in-coupling grating of one LOE 200. Therefore, each spatially separated light beam mainly enters one LOE 200. Accordingly, image data encoded on light beams from each of the sub-light sources 222 by the SLM 240 can be effectively propagated along a single LOE 200 for delivery to an eye of a user.

Each LOE 200 is then configured to project an image or sub-image that appears to originate from a desired depth plane or FOV angular position onto a user's retina. The respective pluralities of LOEs 200 and sub-light sources 222 can therefore selectively project images (synchronously encoded by the SLM 240 under the control of controller 230) that appear to originate from various depth planes or positions in space. By sequentially projecting images using each of the respective pluralities of LOEs 200 and sub-light sources 222 at a sufficiently high frame rate (e.g., 360 Hz for six depth planes at an effective full-volume frame rate of 60 Hz), the system of FIG. 2D can generate a 3-D image of virtual objects at various depth planes that appear to exist simultaneously in the 3-D image.

The controller 230 is in communication with and operatively coupled to the image generating processor 210, the light source 220 (sub-light sources 222) and the SLM 240 to coordinate the synchronous display of images by instructing the SLM 240 to encode the light beams from the sub-light sources 222 with appropriate image information from the image generating processor 210.

The AR system also includes an optional eye-tracking subsystem 270 that is configured to track the user's eyes and determine the user's focus. In one embodiment, only a subset of sub-light sources 222 may be activated, based on input from the eye-tracking subsystem, to illuminate a subset of LOEs 200, as will be discussed below. Based on input from the eye-tracking subsystem 270, one or more sub-light sources 222 corresponding to a particular LOE 200 may be activated such that the image is generated at a desired depth plane that coincides with the user's focus/accommodation. For example, if the user's eyes are parallel to each other, the AR system of FIG. 2D may activate the sub-light sources 222 corresponding to the LOE 200 that is configured to deliver collimated light to the user's eyes, such that the image appears to originate from optical infinity. In another example, if the eye-tracking sub-system 270 determines that the user's focus is at 1 meter away, the sub-light sources 222 corresponding to the LOE 200 that is configured to focus approximately within that range may be activated instead. It should be appreciated that, in this particular embodiment, only one group of sub-light sources 222 is activated at any given time, while the other sub-light sources 220 are deactivated to conserve power.

Figure 2E:
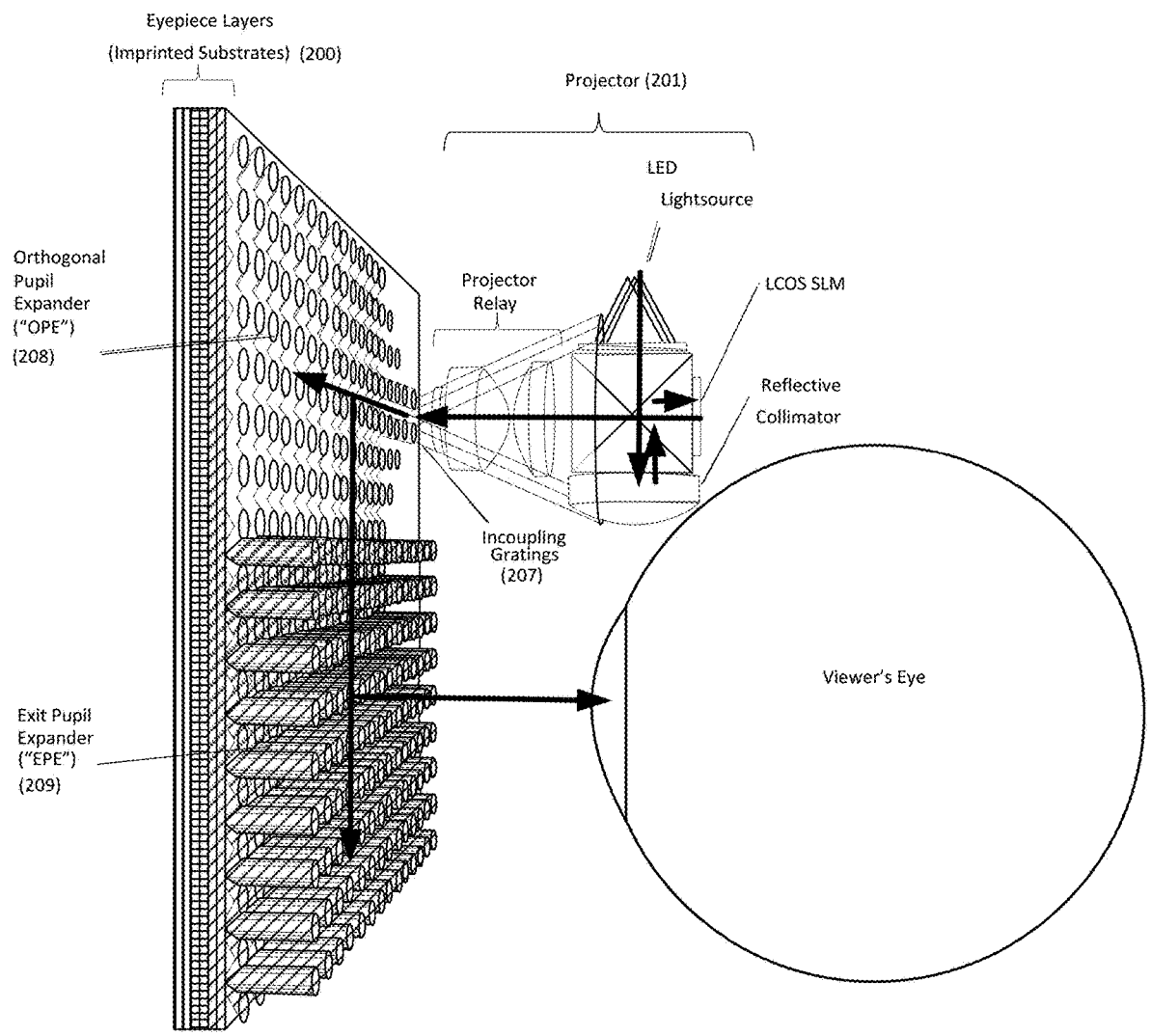
FIG. 2E illustrates schematically the light paths in an exemplary viewing optics assembly (VOA) that may be used to present a digital or virtual image to a viewer, according to an embodiment of the present invention

FIG. 2E illustrates schematically the light paths in an exemplary viewing optics assembly (VOA) that may be used to present a digital or virtual image to a viewer, according to an embodiment of the present invention. In some embodiments, the VOA could be incorporated in a system similar to wearable display device 250 as depicted in FIG. 2B. The VOA includes a projector 201 and an eyepiece 200 that may be worn around a viewer's eye. The eyepiece 200 may, for example, may correspond to LOEs 200 as described above with reference to FIG. 2D. In some embodiments, the projector 201 may include a group of red LEDs, a group of green LEDs, and a group of blue LEDs. For example, the projector 201 may include two red LEDs, two green LEDs, and two blue LEDs according to an embodiment. In some examples, the projector 201 and components thereof as depicted in FIG. 2E (e.g., LED light source, reflective collimator, LCoS SLM, and projector relay) may represent or provide the functionality of one or more of light source 220, sub-light sources 222, SLM 240, and injection optical system 260, as described above with reference to FIG. 2D. The eyepiece 200 may include one or more eyepiece layers, each of which may represent one of LOEs 200 as described above with reference to FIG. 2D. Each eyepiece layer of the eyepiece 200 may be configured to project an image or sub-image that appears to originate from a respective desired depth plane or FOV angular position onto the retina of a viewer's eye.

In one embodiment, the eyepiece 200 includes three eyepiece layers, one eyepiece layer for each of the three primary colors, red, green, and blue. For example, in this embodiment, each eyepiece layer of the eyepiece 200 may be configured to deliver collimated light to the eye that appears to originate from the optical infinity depth plane (0 diopters). In another embodiment, the eyepiece 200 may include six eyepiece layers, i.e., one set of eyepiece layers for each of the three primary colors configured for forming a virtual image at one depth plane, and another set of eyepiece layers for each of the three primary colors configured for forming a virtual image at another depth plane. For example, in this embodiment, each eyepiece layer in one set of eyepiece layers of the eyepiece 200 may be configured to deliver collimated light to the eye that appears to originate from the optical infinity depth plane (0 diopters), while each eyepiece layer in another set of eyepiece layers of the eyepiece 200 may be configured to deliver collimated light to the eye that appears to originate from a distance of 2 meters (0.5 diopter). In other embodiments, the eyepiece 200 may include three or more eyepiece layers for each of the three primary colors for three or more different depth planes. For instance, in such embodiments, yet another set of eyepiece layers may each be configured to deliver collimated light that appears to originate from a distance of 1 meter (1 diopter).

Each eyepiece layer comprises a planar waveguide and may include an incoupling grating 207, an orthogonal pupil expander (OPE) region 208, and an exit pupil expander (EPE) region 209. More details about incoupling grating, orthogonal pupil expansion, and exit pupil expansion are described in U.S. patent application Ser. No. 14/555,585 and U.S. patent application Ser. No. 14/726,424, the contents of which are hereby expressly and fully incorporated by reference in their entirety, as though set forth in full. Still referring to FIG. 2E, the projector 201 projects image light onto the incoupling grating 207 in an eyepiece layer 200. The incoupling grating 207 couples the image light from the projector 201 into the waveguide propagating in a direction toward the OPE region 208. The waveguide propagates the image light in the horizontal direction by total internal reflection (TIR). The OPE region 208 of the eyepiece layer 200 also includes a diffractive element that couples and redirects a portion of the image light propagating in the waveguide toward the EPE region 209. More specifically, collimated light propagates horizontally (i.e., relative to view of FIG. 2E) along the waveguide by TIR, and in doing so repeatedly intersects with the diffractive element of the OPE region 208. In some examples, the diffractive element of the OPE region 208 has a relatively low diffraction efficiency. This causes a fraction (e.g., 10%) of the light to be diffracted vertically downward toward the EPE region 209 at each point of intersection with the diffractive element of the OPE region 208, and a fraction of the light to continue on its original trajectory horizontally along the waveguide via TIR. In this way, at each point of intersection with the diffractive element of the OPE region 208, additional light is diffracted downward toward the EPE region 209. By dividing the incoming light into multiple outcoupled sets, the exit pupil of the light is expanded horizontally by the diffractive element of the OPE region 208. The expanded light coupled out of the OPE region 208 enters the EPE region 209.

The EPE region 209 of the eyepiece layer 200 also includes a diffractive element that couples and redirects a portion of the image light propagating in the waveguide toward a viewer's eye. Light entering the EPE region 209 propagates vertically (i.e., relative to view of FIG. 2E) along the waveguide by TIR. At each point of intersection between the propagating light and the diffractive element of the EPE region 209, a fraction of the light is diffracted toward the adjacent face of the waveguide allowing the light to escape the TIR, emerge from the face of the waveguide, and propagate toward the viewer's eye. In this fashion, an image projected by projector 201 may be viewed by the viewer's eye. In some embodiments, the diffractive element of the EPE region 209 may be designed or configured to have a phase profile that is a summation of a linear diffraction grating and a radially symmetric diffractive lens. The radially symmetric lens aspect of the diffractive element of the EPE region 209 additionally imparts a focus level to the diffracted light, both shaping the light wavefront (e.g., imparting a curvature) of the individual beam as well as steering the beam at an angle that matches the designed focus level. Each beam of light outcoupled by the diffractive element of the EPE region 209 may extend geometrically to a respective focus point positioned in front of the viewer, and may be imparted with a convex wavefront profile with a center of radius at the respective focus point to produce an image or virtual object at a given focal plane.

Descriptions of such a viewing optics assembly and other similar set-ups are further provided in U.S. patent application Ser. No. 14/331,218, U.S. patent application Ser. No. 15/146,296, and U.S. patent application Ser. No. 14/555,585, all of which are incorporated by reference herein in their entireties. It follows that, in some embodiments, the exemplary VOA may include and/or take on the form of one or more components described in any of the patent applications mentioned above with reference to FIG. 2E and incorporated herein by reference.

Figure 3A:
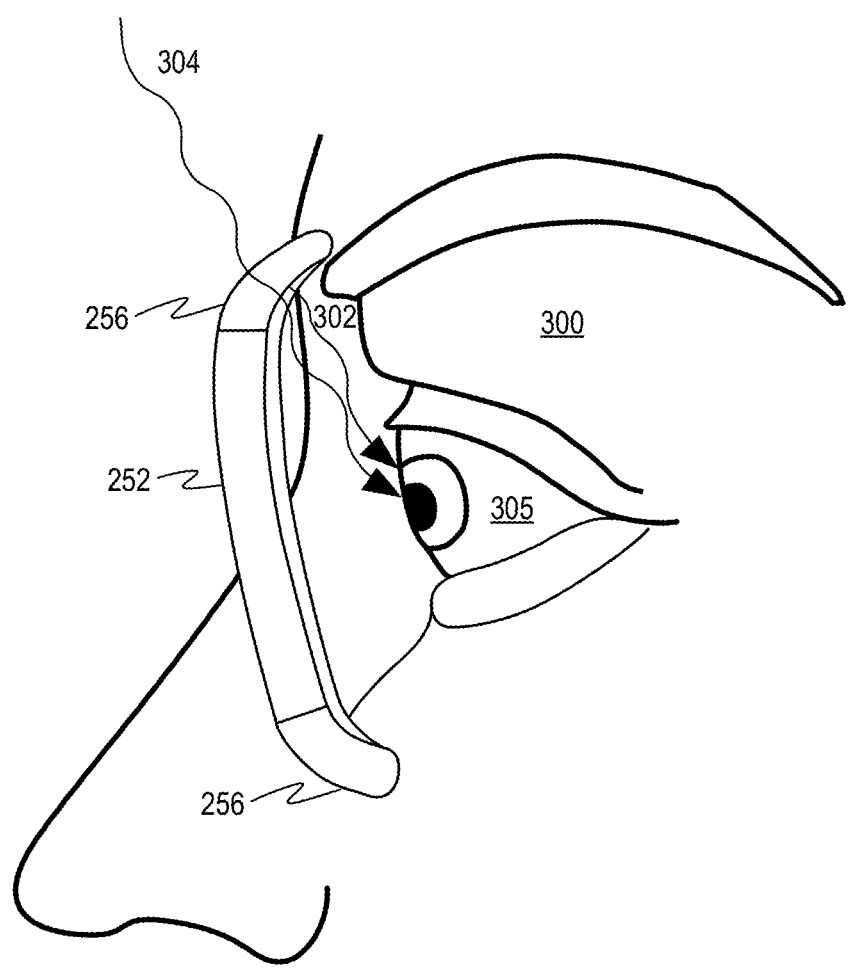
FIG. 3A shows how a peripheral display can conform to the contours of the face of a user according to some embodiments.

FIG. 3A shows how peripheral display 256 can conform to the contours of the face of a user 300. In some embodiments, peripheral display 256 can have a greater curvature than main display 252 so that peripheral display 256 can contact the face of user 300 without requiring substantial curvature of the higher resolution main display 204. Contact between peripheral display 256 and the face of the user effectively allows peripheral display 256 to project content 302 alongside any external light 304 reaching an eye 305 of user 300 from above or below main display 204. In some embodiments, peripheral display 256 can be configured to deform in order to conform to the face of user 300. Furthermore, main display 252 can also undergo deformation to accommodate certain contours of a face of user 300. In some embodiments, a mechanical coupling between peripheral display 256 and main display 252 can be configured to accommodate rotation of peripheral display 256 with respect to main display 252. For example, a flexible or elastomeric coupling accommodating the rotation can couple main display 252 to peripheral display 256. An interior-facing surface of peripheral display 256 can include a pad or sealing element for increasing the comfort of user 300 while wearing wearable display device 250. In other embodiments, peripheral display 256 can extend in a more vertical direction than depicted from main display 204 so as not to contact the face of user 300 while the user is wearing wearable display device 250.

Figure 3B:
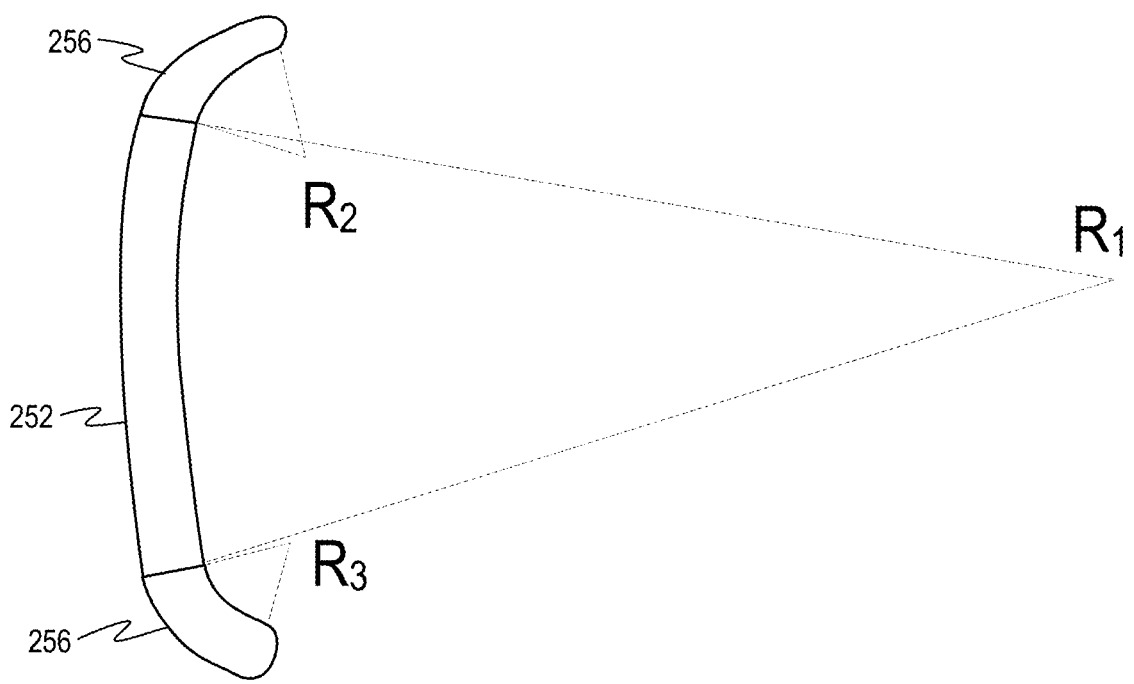
FIG. 3B compares the radius of curvature of the peripheral and main displays depicted in FIG. 3A according to some embodiments.

FIG. 3B shows how a radius of curvature $R_1$ for main display 252 is substantially greater than radius of curvature $R_2$ and radius of curvature $R_3$. Since curvature is inversely proportional to radius of curvature, main display 252 has a much smaller curvature than peripheral display 256. FIG. 3B also illustrates how radius of curvature $R_2$ can be different than radius of curvature $R_3$. Differences in curvature can be changed even more when peripheral display 256 bends and flexes to accommodate the shape of the face of user 300.

Figure 3C:
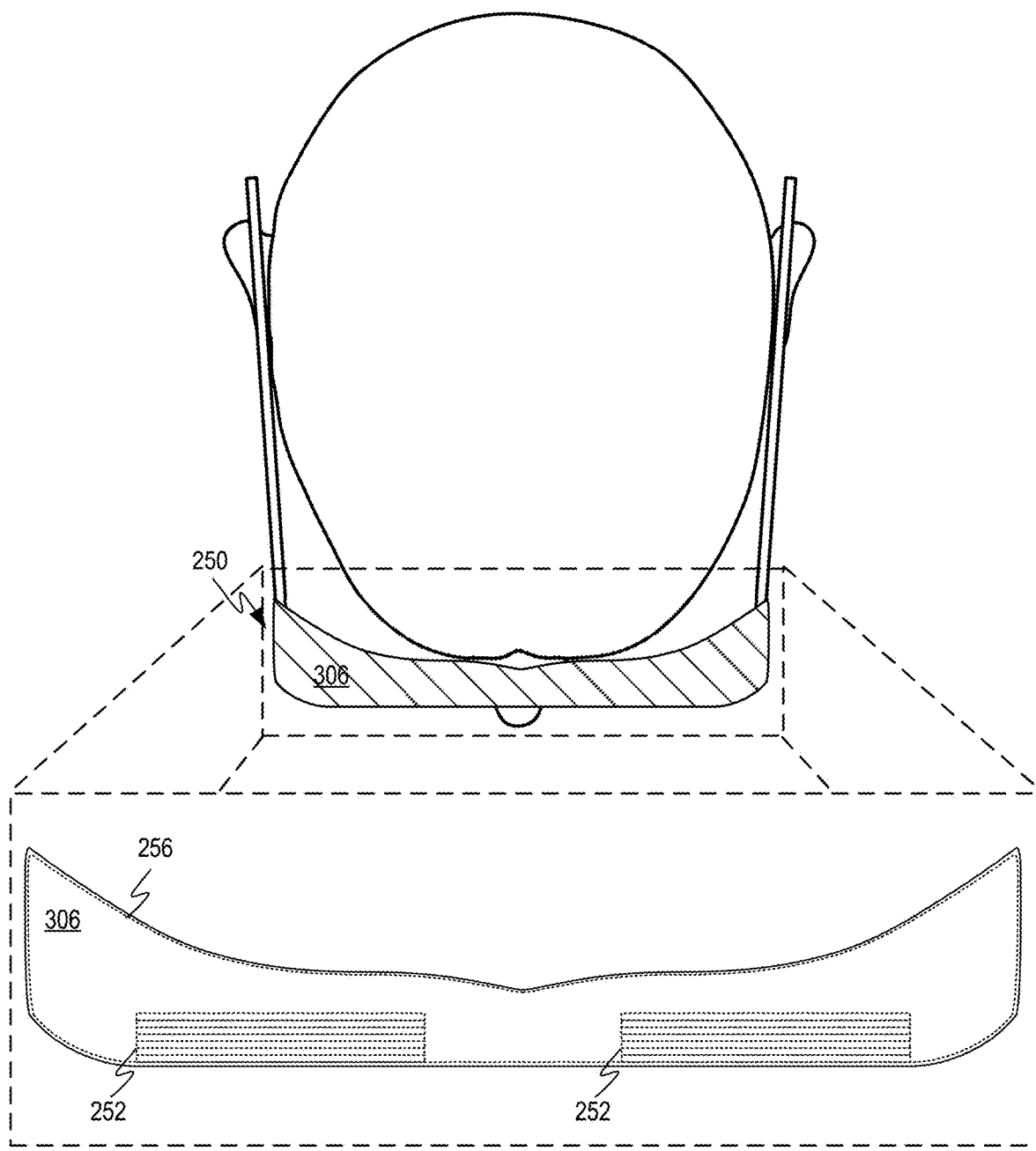
FIGS. 3C-3D show top views of various main and peripheral displays incorporated within a wearable device according to some embodiments.

FIG. 3C shows a top view of wearable device 250 worn on a user's head. As depicted, wearable device 250 can include a visor 306 having a primary viewing port corresponding to a surface to upon which main displays 252 are mounted. Visor 306 can also include walls extending from the viewing port toward a user's face on top, bottom and lateral sides of the viewing port. In some embodiments, the walls can protrude from the viewing port at a substantially orthogonal angle. Peripheral display 256 can then be adhered to an interior or exterior facing surface of the walls so that imagery can be overlaid upon light entering through any one of the walls. In some embodiments, peripheral display 256 can also cover portions of the primary viewing port that are not covered by main displays 252. It should be noted that while wearable device 250 is not depicted extending all the way to a user's head that in some embodiments, the walls of visor 306 can be configured to come into full contact with a user's face, allowing most if not all portions of the user's peripheral vision to be covered by peripheral display 256.

Figure 3D:
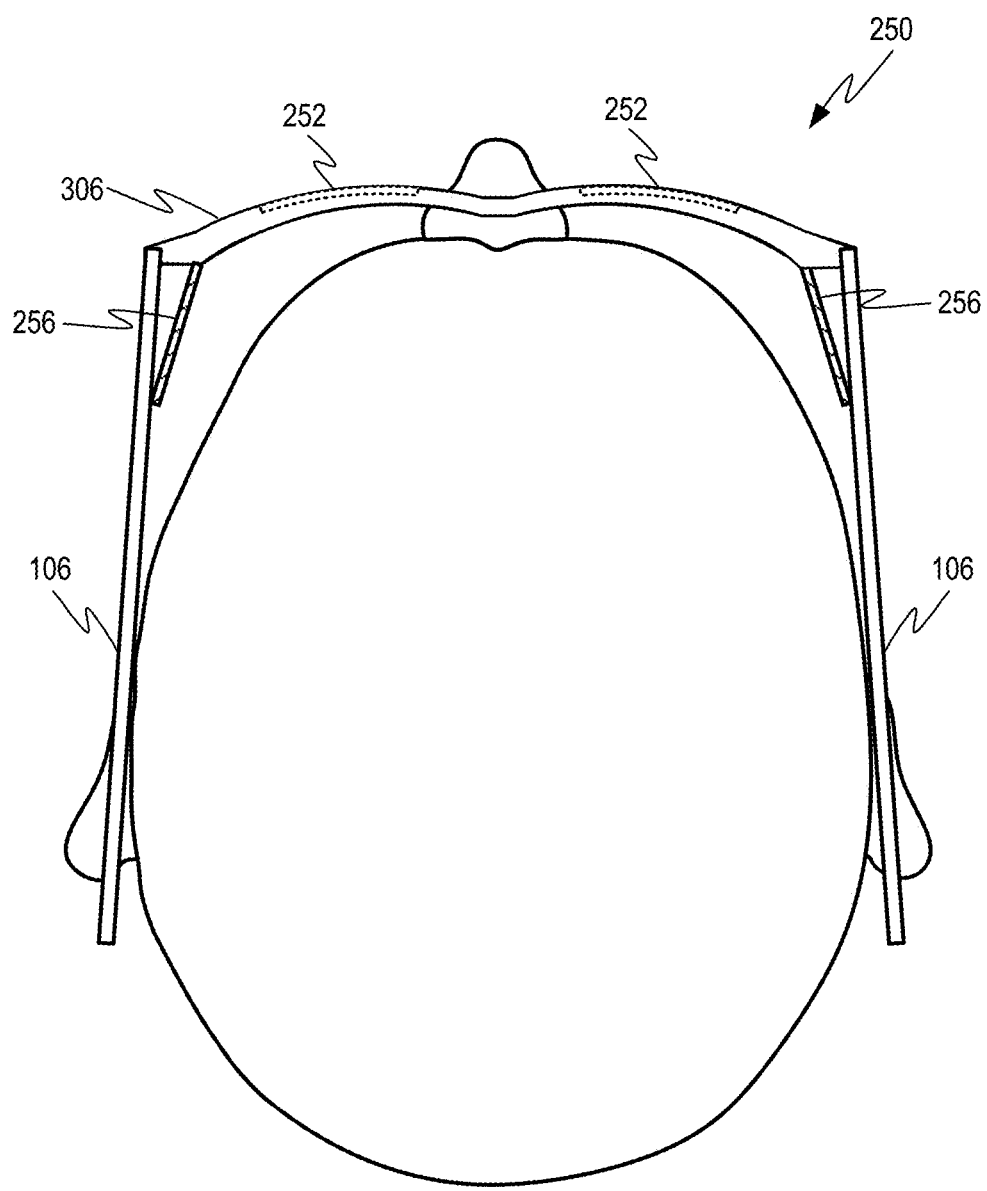

FIG. 3D shows how a peripheral display 256 can be incorporated into wearable device 250 in a more limited manner. Peripheral display 256 can be embodied by two flexible displays extending from a portion of each temple 106 to an interior-facing surface of visor 306. The flexible nature of peripheral display 256 can then accommodate folding of temples 106 into visor 306. In this way, a lateral periphery of a user's peripheral vision can be covered without reducing the stowability of wearable device 250. In some embodiments, peripheral display 256 can also extend within portions of visor 306. For example, portions of visor 306 not covered by main displays 252 could be covered by additional portions of peripheral display 256. In some embodiments, peripheral display 256 can be single display extending from one of temples 106 to the other temple 106.

Figure 3E:
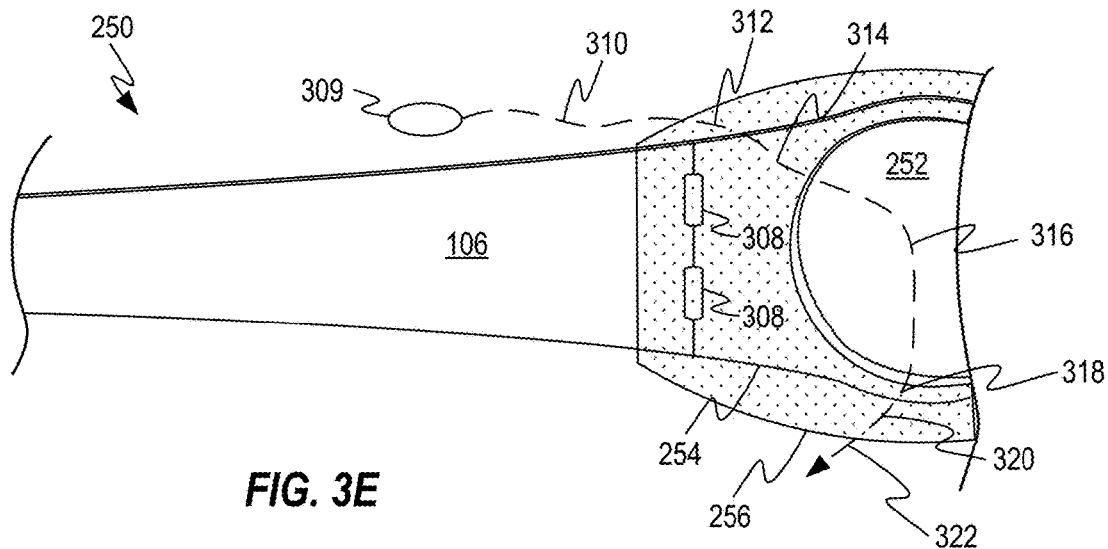
FIG. 3E shows an interior-facing surface of a wearable or head-mounted display device according to some embodiments.

FIG. 3E shows an interior-facing surface of a wearable or head-mounted display device 250. Wearable display device 250 includes a frame or visor 254 pivotally coupled with temple arm 106 by hinges 308. As depicted, frame 254 supports main display 252 and provides a surface to which peripheral display 256 can be affixed. Peripheral display 256 is shaded for emphasis. In particular, FIG. 3E shows how peripheral display 256 can display virtual content 309 as it repeatedly enters and exits a position in space that causes peripheral display 256 to render a representation of virtual content 309.

Figure 3F:
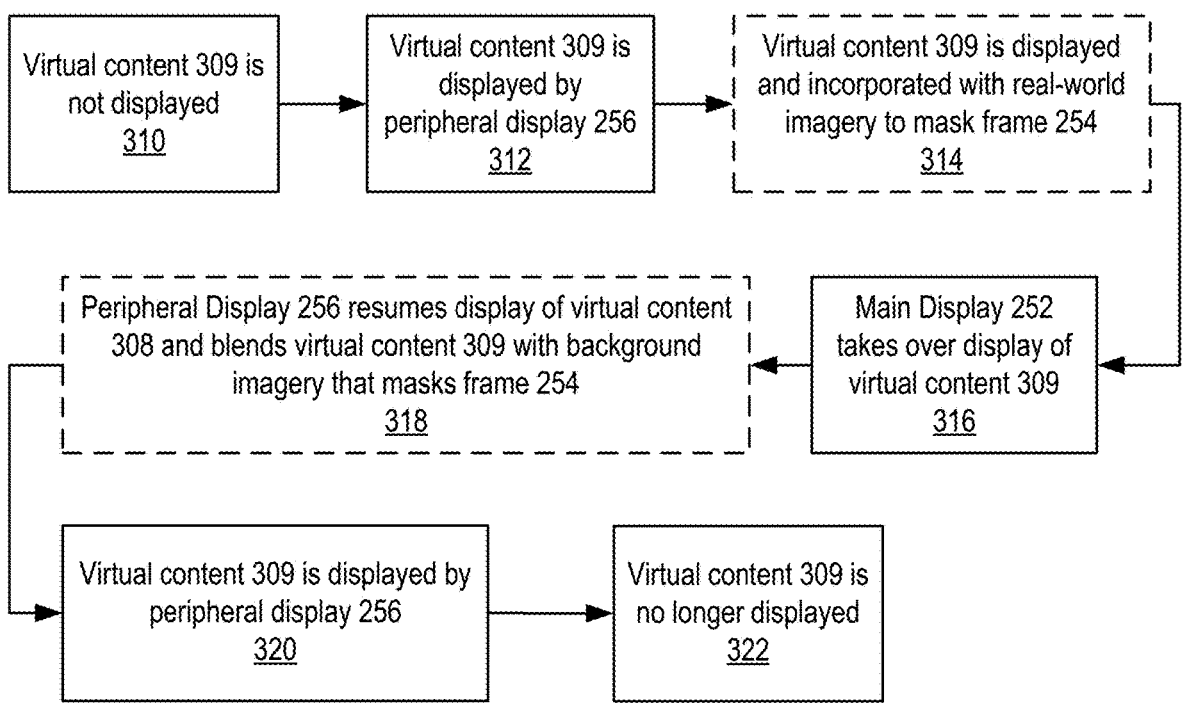
FIG. 3F shows a flowchart describing how peripheral display represents virtual content travelling along a path according to some embodiments.

FIG. 3F shows a flowchart describing how peripheral display 256 represents virtual content 309 travelling along a path. The dashed line indicates the path of virtual content 309. Because virtual content 309 follows a path through three-dimensional space, wearable display device 250 will not always show virtual content 309. Segment 310 represents a portion of the path that occurs outside of the field of view of the head-mounted display. Segment 312 is that portion of the path that corresponds to virtual content 309 first being located in a position in which peripheral display 256 is responsible for displaying virtual content 309. In some embodiments, peripheral display 256 can be configured to show virtual content 309 at higher intensity levels and/or refresh rates in order to help a user become aware of virtual content 309 more quickly. For example, because peripheral vision is typically more effective at tracking fast moving objects a higher refresh rate could help a user to identify objects being represented by peripheral display 256. In some embodiments, peripheral display 256 could at least initially depict virtual content 309 at segment 312 as a bright blob of color or a flashing light in order to help guide a user's attention to the incoming content. In some embodiments, a peripheral portion of peripheral display 256 could be illuminated in a predetermined manner in order to alert a user that a particular event has occurred. For example, a quickly flashing light could indicate an incoming augmented reality object is imminently entering a user's field of view while a slowly pulsing blue orb could indicate receipt of a text or in-game message.

At segment 314, as virtual content 309 approaches more closely to main display 252, a clear view of the outside world can be blocked by frame 254, when frame 254 is optically opaque. In some embodiments, the portion of peripheral display 256 positioned in front of frame 254 can be configured to display real-world content gathered by a camera mounted to the wearable device to present a user with a view effectively unobstructed by frame 254. In this way, the real-world content can be mixed with virtual content 309 to create a virtual representation of virtual and real-world content. In some embodiments, the real-world content reproduced by peripheral display 256 can be based at least in part upon a measured intensity and color of ambient light present in the surrounding environment. Such an implementation can create a greater feeling of unrestricted vision and immersion without the need to incorporate a video feed from an additional camera. Any fine detail missing from constructing the view in this manner could go largely unnoticed on account of a user not being able to focus directly on that portion of the user's field of view. It should be noted that the step of overlaying real-world imagery atop mask frame 254 is an optional operation and in some embodiments, it could be more desirable to either not show any content at all during segment 314 to accentuate the presence of frame 254 or to just show virtual content as it travels across segment 314. Once virtual content reaches segment 314, peripheral display 256 could begin displaying virtual content 309 in greater detail as a person's ability to perceive higher resolution increases.

At segment 316, main display 252 takes over display of virtual content 309. Because peripheral display 258 and main display 252 are in abutting contact, virtual content 309 can stay continuously in view as it transitions from peripheral display 256 to main display 252. At segment 318, peripheral display 256 resumes display of virtual content 309 and blends virtual content 309 with background imagery that masks frame 254 from a user's view. It should be noted that as with segment 314, the display of background real-world imagery can be an optional step. At segment 320 peripheral display 258 creates a representation of only virtual content 309 and at segment 322 peripheral display 256 ceases displaying virtual content 309.

Figure 4A:
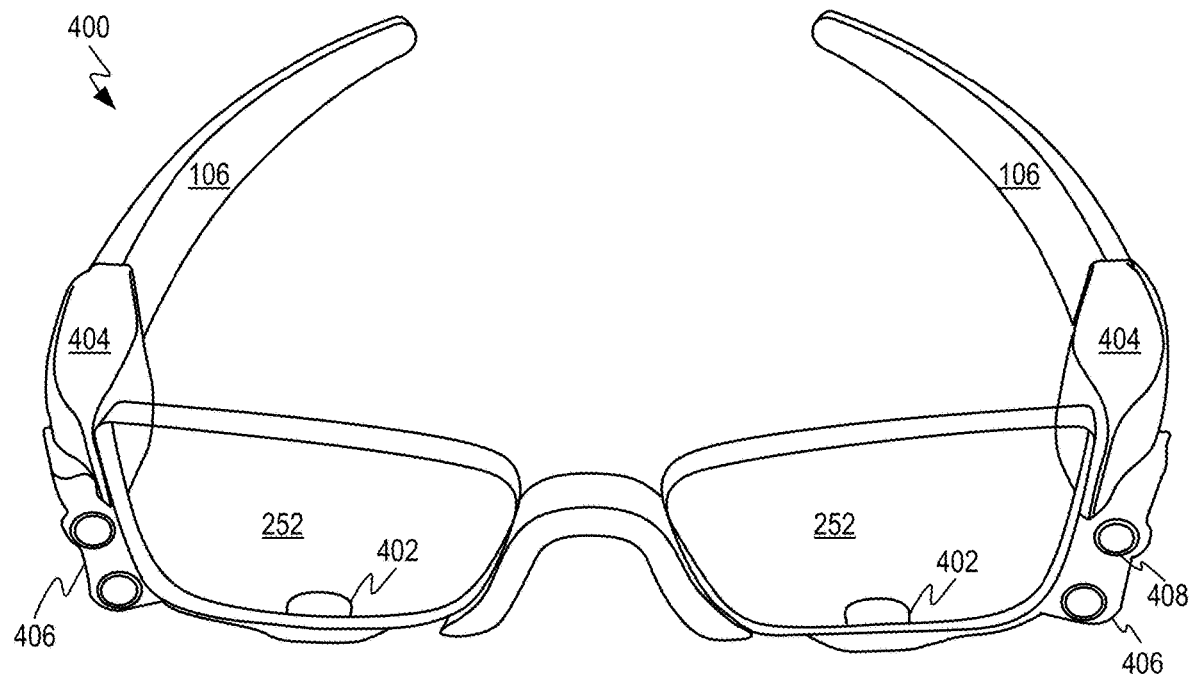
FIG. 4A shows a perspective view of an exemplary wearable display device without a peripheral display according to some embodiments.

FIG. 4A shows a perspective view of an exemplary wearable display device 400 without a peripheral display. Wearable display device 400 includes main displays 252. Each of main displays 252 can include an eye tracking sensor 402 configured to track the movement of the eyes of a user of wearable display device 400. In some embodiments, the resolution of imagery depicted by main displays 252 can be adjusted to account for movement of the eyes of the user as determined by eye tracking sensors 402. For example, the resolution can vary across the surface of main displays 252 so that processing power can be devoted to providing high resolution in only those areas being focused on by the eyes of a user. The other areas can be rendered in lower resolution. Wearable display device 400 also includes projector assemblies 404, which are integrated into temple arms 106. Projector assemblies 404 can include projectors that shine light through diffractive optics that is then reflected into the eyes of a user through main displays 252. Wearable display device 400 can also include camera assemblies 406. Each of camera assemblies 406 can include a number of camera modules 408 for observing and characterizing the environment surrounding wearable display device 400. Characterization of the environment can be important for numerous reasons including for example for incorporating virtual content with real life objects in the environment. For example, being able to identify items such as chairs using the camera modules could allow a virtual character to sit on one of the real world chairs instead of having to generate a virtual chair or give the appearance of being seated in the air. In some embodiments, wearable display device 400 can include one or more camera modules 408 with depth detection sensors for synchronizing the depth of virtual content displayed by main displays 204. As with projector assemblies 404, camera assemblies 406 can be incorporated with temple arms 106.

Figure 4B:
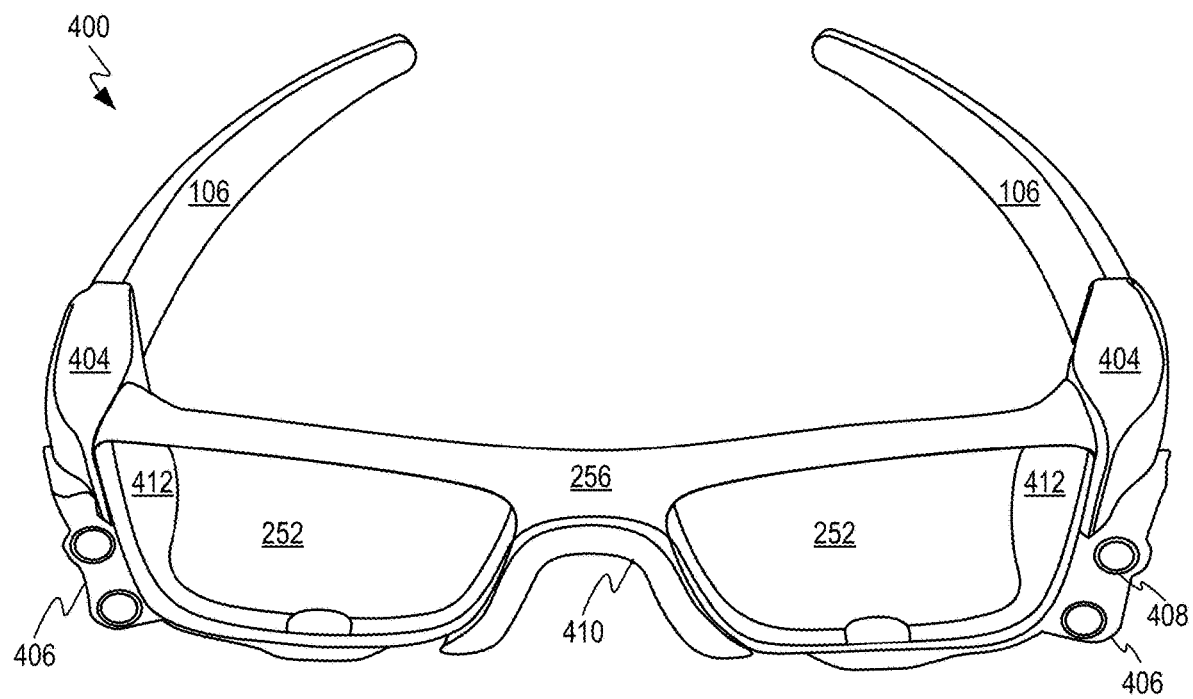
FIG. 4B shows how a peripheral display can be incorporated with the wearable display device depicted in FIG. 4A according to some embodiments.

FIG. 4B shows how peripheral display 256 can be incorporated into wearable display device 400. As depicted, peripheral display 256 can be arranged along the periphery of each of main displays 252. Peripheral display 256 can also extend between main displays 252 to prevent any coverage gap above bridge 410. In some embodiments, temple regions 412 of peripheral display 256 can extend farther away from main displays 252 than the rest of peripheral display 256. Temple regions 412 can be configured to display content to obscure projector assemblies 404 and camera assemblies 406 from a user's peripheral field of view. This can help a user feel more immersed in the surrounding virtual and/or real-world content.

Figure 5A:
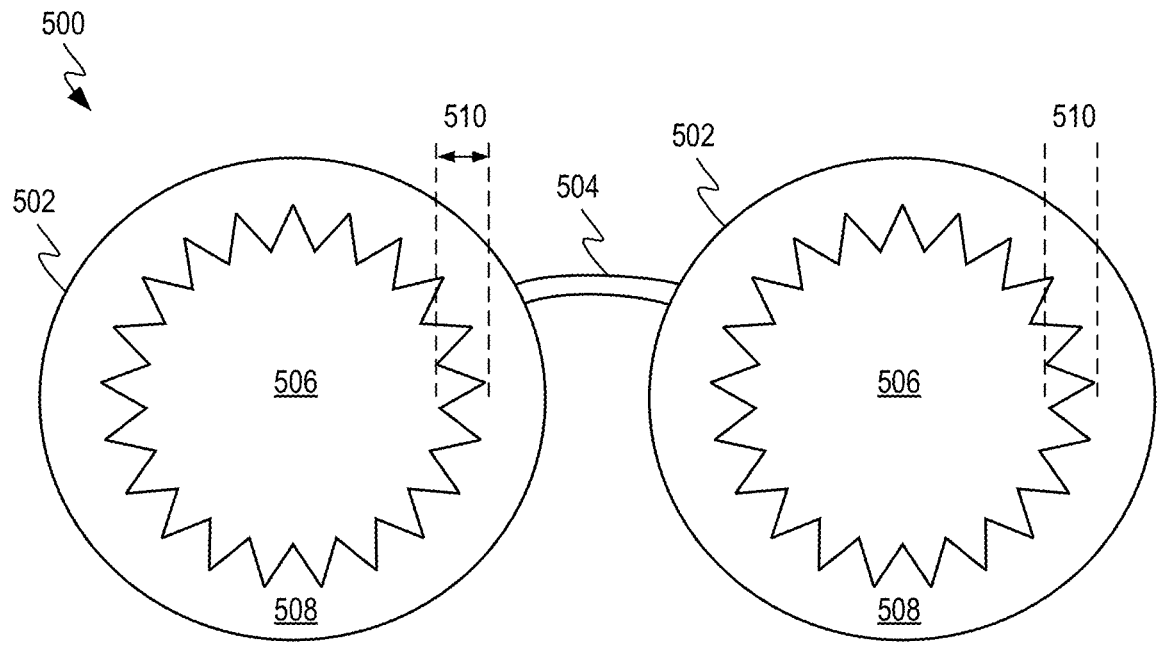
FIG. 5A shows a wearable display device that includes two multi-region displays joined by a bridge according to some embodiments.

FIG. 5A shows a wearable display device 500 that includes two displays 502 joined by a bridge 504. In particular, FIG. 5A shows how displays 502 can have two different regions configured to display content in different ways. High acuity regions 506 can transition to low acuity regions 508 in transition regions 510 as indicated by the protruding star patterns. The change in acuity can be accomplished in many different ways. In some embodiments, the low acuity region can have the same number of pixels as the high acuity region and simply display content at a lower resolution. For example, four pixels in low acuity region 508 could display the same value so that low acuity regions 508 have a spatial resolution four times lower than the spatial resolution of the high acuity regions 506. In other embodiments, the spacing between pixels in low acuity regions 508 could be greater than in high acuity regions 506. In some embodiments, the pixels in low acuity regions 508 could be larger than those in high acuity regions 506 due to the additional space provided by the greater pixel spacing. Transition region 510 could also have pixels that were spaced gradually farther apart to create a more even transition between regions 506 and 508. It should be noted that high acuity regions 506 and low acuity regions 508 can have many different variations not limited to differences in spatial recognition. For example, low acuity regions 508 could display fewer colors, refresh at different rates and even display virtual content at different levels of intensity (i.e. brightness) than high acuity regions 506.

Figure 5B:
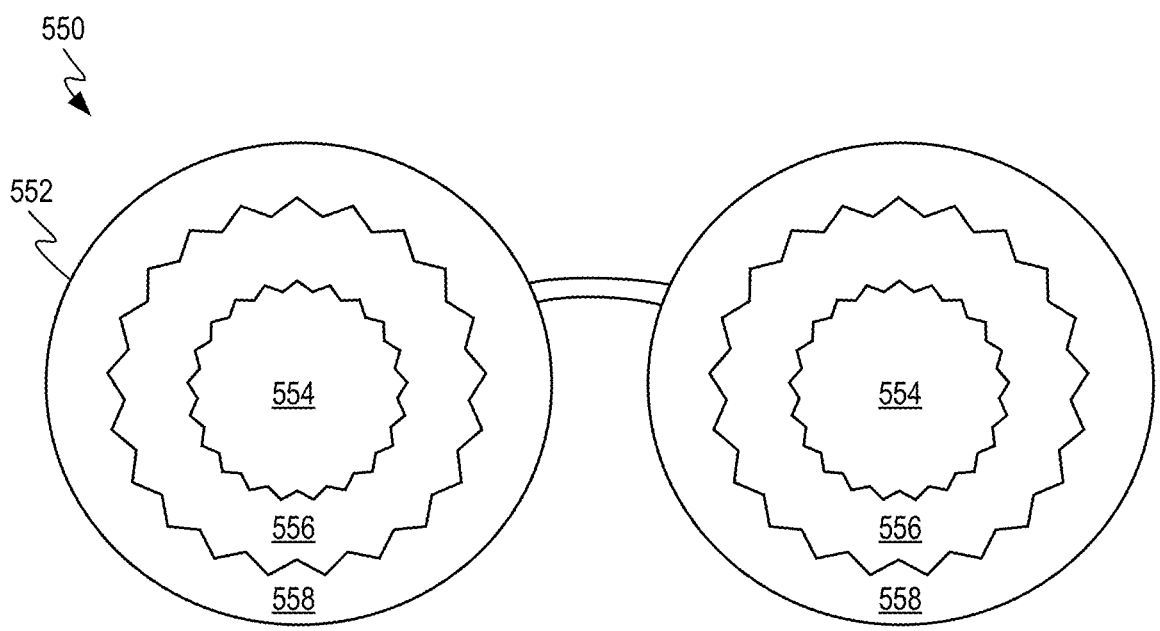
FIG. 5B shows a wearable display device having displays with multiple display regions according to some embodiments.

FIG. 5B shows a wearable display device 550 having displays 552 with multiple regions 554, 556 and 558. Regions 554 can be designed to correspond to the capability of the human eye to distinguish color and spatial resolution. Since the center of the eye has the highest concentration of cones, which have the best capability to distinguish detail and color, region 554 can be configured to emit the highest resolution and truest color reproduction. Region 556 can be configured to display virtual content at a relatively lower spatial and/or color resolution. In some embodiments, region 556 can be arranged along a border of a field of regard of a user of wearable display device 550. For this reason, differences between region 556 and region 554 can be implemented over a transition zone between regions 554 and 556, such that the change in resolution is not obvious or distracting to a user of wearable display device 550. Similarly, region 558 can cover the portion of a user's field of view corresponding to the far peripheral field of view. Region 558 can be configured to display virtual content at even lower resolutions than region 556. For example, region 558 can be configured to display virtual content in gray scale.

Figure 5C:
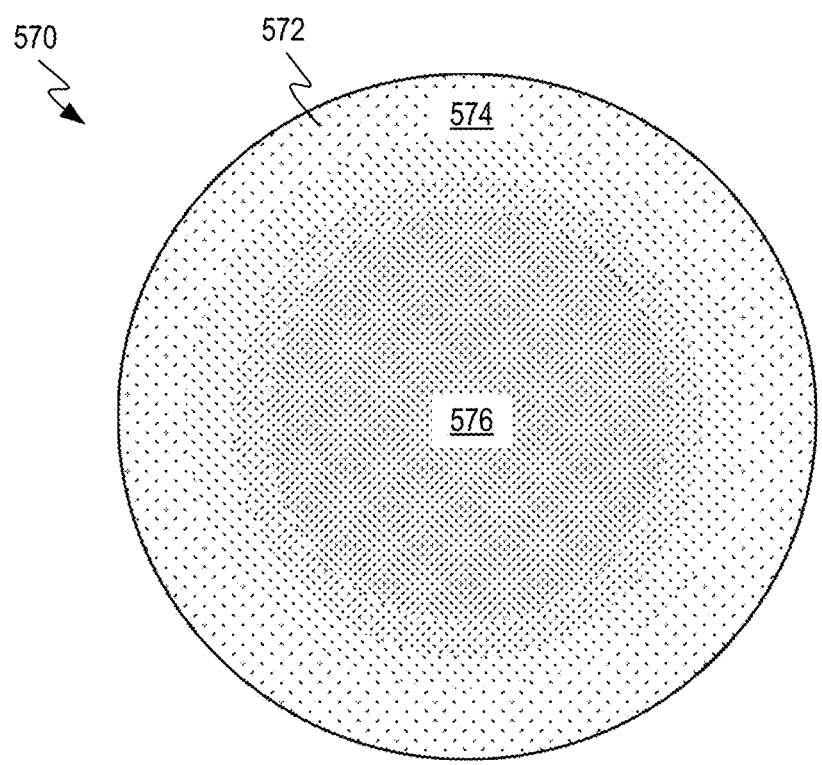
FIG. 5C shows a multi-resolution display 570 similar to the displays depicted in FIGS. 5A and 5B according to some embodiments.

FIG. 5C shows a display 570 similar to display 502 and 552. A distribution of pixels 572 can vary across display 570. In particular, pixels 572 are shown having a lower density in a peripheral region 574 and a higher density in a central region 576. By setting display 570 up in this manner, the spatial resolution of any imagery displayed by display 570 can be gradually reduced as virtual content moves from central region 576 into peripheral region 574 of display 570.

Figure 6:
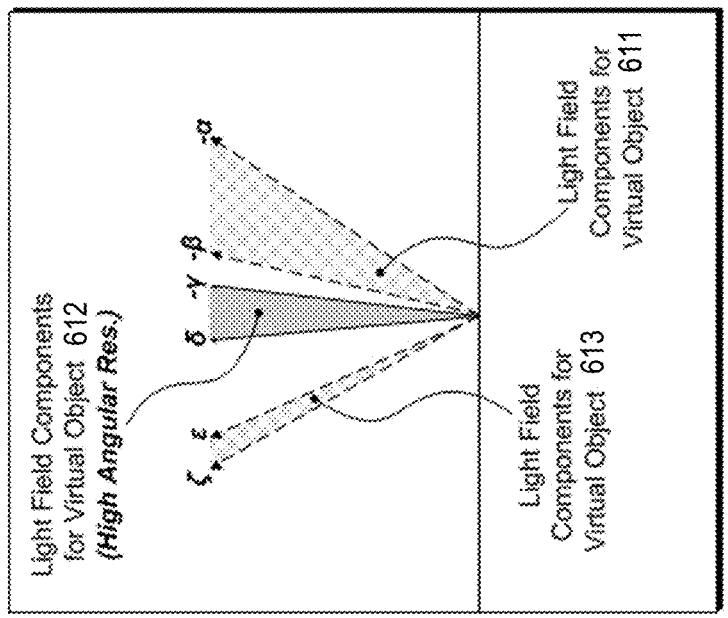
FIGS. 6-7 show display components associated with a particular display technology.
Figure 6:
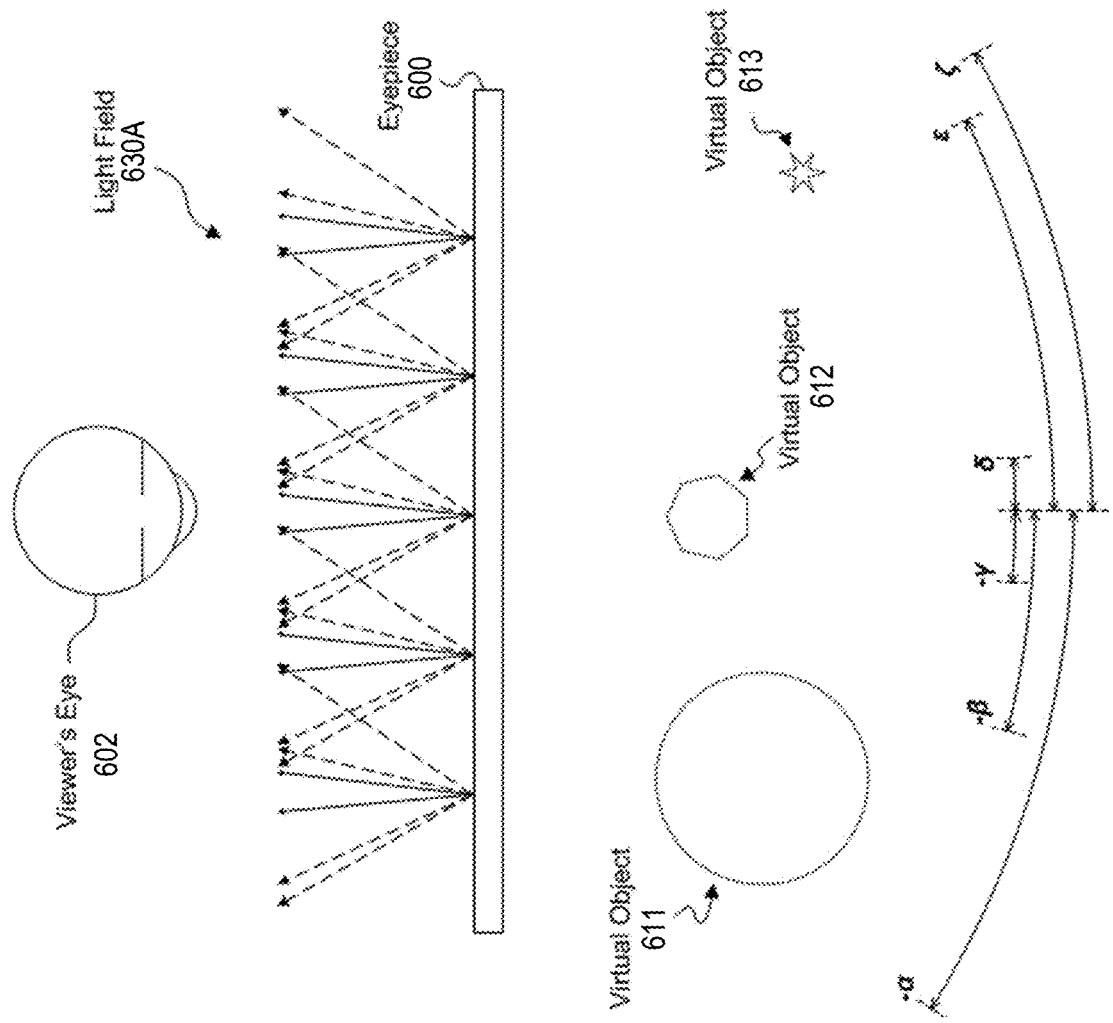
Figure 7:
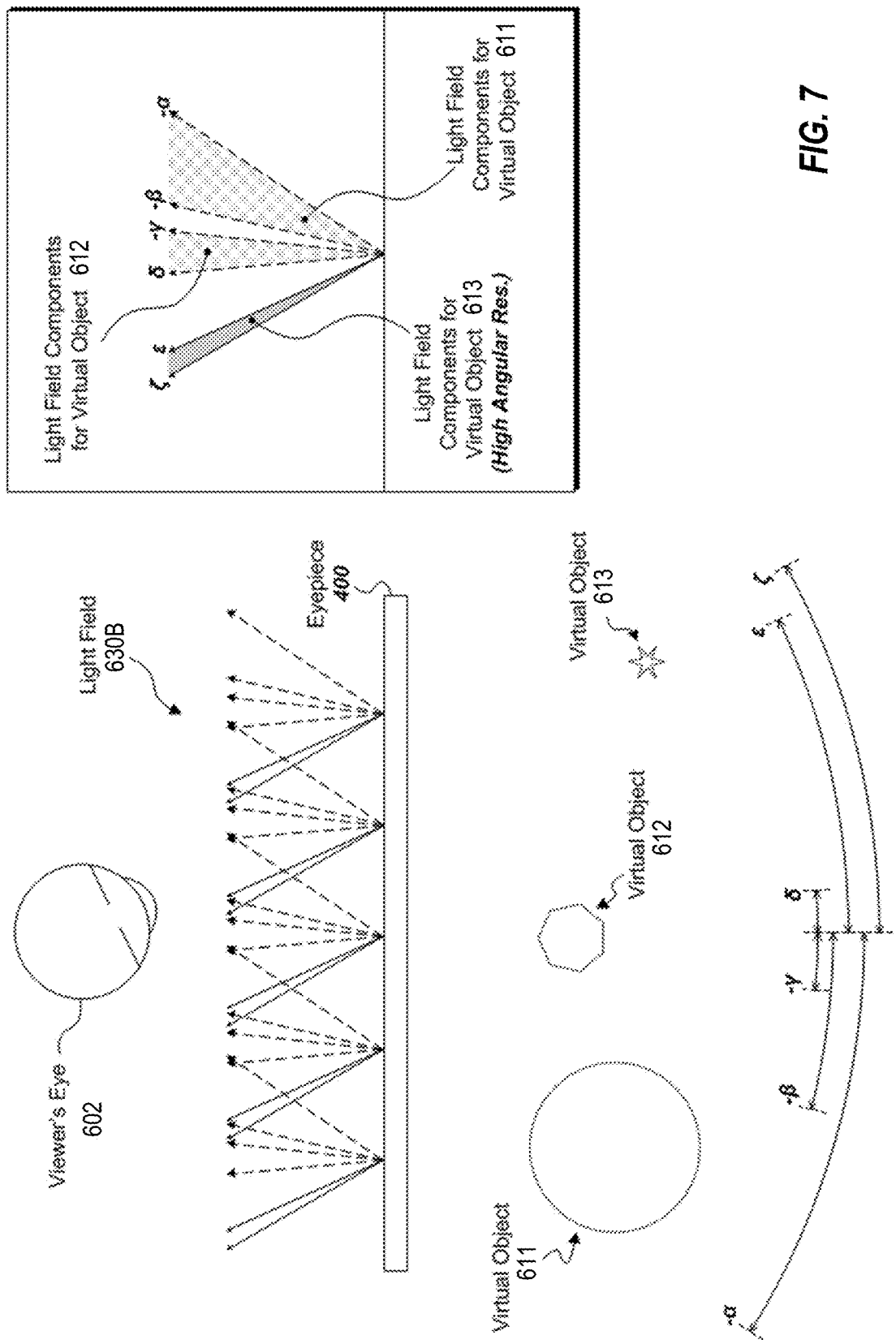

FIGS. 6 and 7 describe in detail a display technology that can be used with main displays, such as main displays 102, 112, 122, 134, 136, 144, 166, 172, 184, 252, 506, 554 and 576. In some embodiments, a peripheral display can also utilize this type of display technology. The displays can incorporate eye-tracking apparatus or not for further optimizing the position in which high and low resolution imagery are being displayed.

In FIG. 6, a viewer's eye 602 is oriented in a first manner with respect to an eyepiece 600, such that the viewer may be able to see the eyepiece 600 in a relatively straightforward direction. The orientation of the viewer's eye 602 in FIG. 6 may, for instance, be the same as or similar to the orientation of the viewer's eye 302 as described above with reference to FIGS. 3A-3B, and may be determined by the AR system using one or more of the sensing components and/or techniques described herein. As such, in the stage depicted in FIG. 6, the AR system may employ head-tracked and fovea-tracked render perspectives at relative positions and orientations. The FOV of the fovea-tracked render perspective employed by the AR system may, for instance, encompass virtual object 612, but may not encompass either of virtual objects 611 and 613. It follows that, in FIG. 6, the AR system may render virtual object 612 as it would be captured from the perspective of the fovea-tracked virtual camera in high definition, and may render virtual objects 611 and 613 as they would be captured from the perspective of the head-tracked virtual camera in lower definition. In addition, the AR system may project light representing such renderings of virtual objects 611, 612, and 613 through the eyepiece 600 and onto the retina of the viewer's eye 602. In some embodiments, the AR system may also render virtual object 612 as it would be captured from the perspective of the head-tracked virtual camera in lower definition.

FIG. 6 also illustrates an exemplary light field 630A that is outcoupled by the eyepiece 600 and projected onto the retina of the viewer's eye 602. The light field 630A may include various angular light components representative of one or more of the abovementioned renderings of virtual objects 611, 612, and 613. For example, angular light components of the light field 630A that are representative of the virtual object 611 as it would be captured from the perspective of the head-tracked virtual camera may include those which are to be projected onto the retina of the viewer's eye 602 at angles ranging from $-\alpha$ to $-\beta$ angular units relative to the viewer's eye 602, and angular light components of the light field 630A that are representative of the virtual object 613 as it would be captured from the perspective of the head-tracked virtual camera may include those which are to be projected onto the retina of the viewer's eye 602 at angles ranging from $\epsilon$ to $\zeta$ angular units relative to the viewer's eye 602. Similarly, angular light components of the light field 630A that are representative of the virtual object 612 as it would be captured from the perspective of the fovea-tracked virtual camera may include those which are to be projected onto the fovea of the viewer's eye 602 at angles ranging from $-\gamma$ to $\delta$ angular units relative to the viewer's eye 602. As such, components of the light field 630A that are representative of virtual object 612 (i.e., components to be projected at angles ranging from $-\gamma$ to $\delta$ angular units relative to the viewer's eye 602) may be more densely distributed in angular space than components of the light field 630A that are representative of virtual object 611 or 613 (i.e., components to be projected at angles ranging from $-\alpha$ to $\beta\beta$ or $\epsilon$ to $\zeta$ angular units relative to the viewer's eye 602). In this way, the resolution at which the virtual object 612 may be rendered and presented to the viewer may be higher than the resolution at which virtual object 611 or 613 may be rendered and presented to the viewer.

In FIG. 7, the viewer's eye 602 is oriented in a second manner with respect to the eyepiece 600 different from the first manner in which the viewer's eye 602 is oriented with respect to the eyepiece 600 in FIG. 6. The orientation of the viewer's eye 602 in FIG. 7 may be determined by the AR system using one or more of the sensing components and/or techniques described herein. As such, in the stage depicted in FIG. 7, the AR system may employ head-tracked and fovea-tracked render perspectives at relative positions and orientations similar to those of the head-tracked and fovea-tracked render perspectives. In the particular example of FIG. 7, the FOV of the fovea-tracked render perspective employed by the AR system may, for instance, encompass virtual object 613, but may not encompass either of virtual objects 611 and 612. It follows that, in FIG. 7, the AR system may render virtual object 613 as it would be captured from the perspective of the fovea-tracked virtual camera in high definition, and may render virtual objects 611 and 612 as they would be captured from the perspective of the head-tracked virtual camera in lower definition. In addition, the AR system may project light representing such renderings of virtual objects 611, 612, and 613 through the eyepiece 600 and onto the retina of the viewer's eye 602. In some embodiments, the AR system may also render virtual object 613 as it would be captured from the perspective of the head-tracked virtual camera in lower definition.

FIG. 7 also illustrates an exemplary light field 630B that is outcoupled by the eyepiece 600 and projected onto the retina of the viewer's eye 602. The light field 630B may include various angular light components representative of one or more of the abovementioned renderings of virtual objects 611, 612, and 613. For example, angular light components of the light field 630B that are representative of the virtual object 611 as it would be captured from the perspective of the head-tracked virtual camera may include those which are to be projected onto the retina of the viewer's eye 602 at angles ranging from $-\alpha$ to $-\beta$ angular units relative to the viewer's eye 602, and angular light components of the light field 630B that are representative of the virtual object 612 as it would be captured from the perspective of the head-tracked virtual camera may include those which are to be projected onto the retina of the viewer's eye 602 at angles ranging from $-\gamma$ to $\delta$ angular units relative to the viewer's eye 602. Similarly, angular light components of the light field 630B that are representative of the virtual object 613 as it would be captured from the perspective of the fovea-tracked virtual camera may include those which are to be projected onto the fovea of the viewer's eye 602 at angles ranging from $\varepsilon$ to $\zeta$ angular units relative to the viewer's eye 602. As such, components of the light field 630B that are representative of virtual object 613 (i.e., components to be projected at angles ranging from $\varepsilon$ to $\zeta$ angular units relative to the viewer's eye 602) may be more densely distributed in angular space than components of the light field 630A that are representative of virtual object 611 or 612 (i.e., components to be projected at angles ranging from $-\alpha$ to $-\beta$ or $-\gamma$ to $\delta$ angular units relative to the viewer's eye 602). In this way, the resolution at which the virtual object 613 may be rendered and presented to the viewer may be higher than the resolution at which virtual object 611 or 612 may be rendered and presented to the viewer. Indeed, from the stage of FIG. 6 to the stage of FIG. 7, the AR system described herein with reference thereto has effectively reoriented the perspective from which virtual content may be viewed in high resolution in accordance with the change in gaze of the viewer's eye 602 between stages.

Figure 8A:
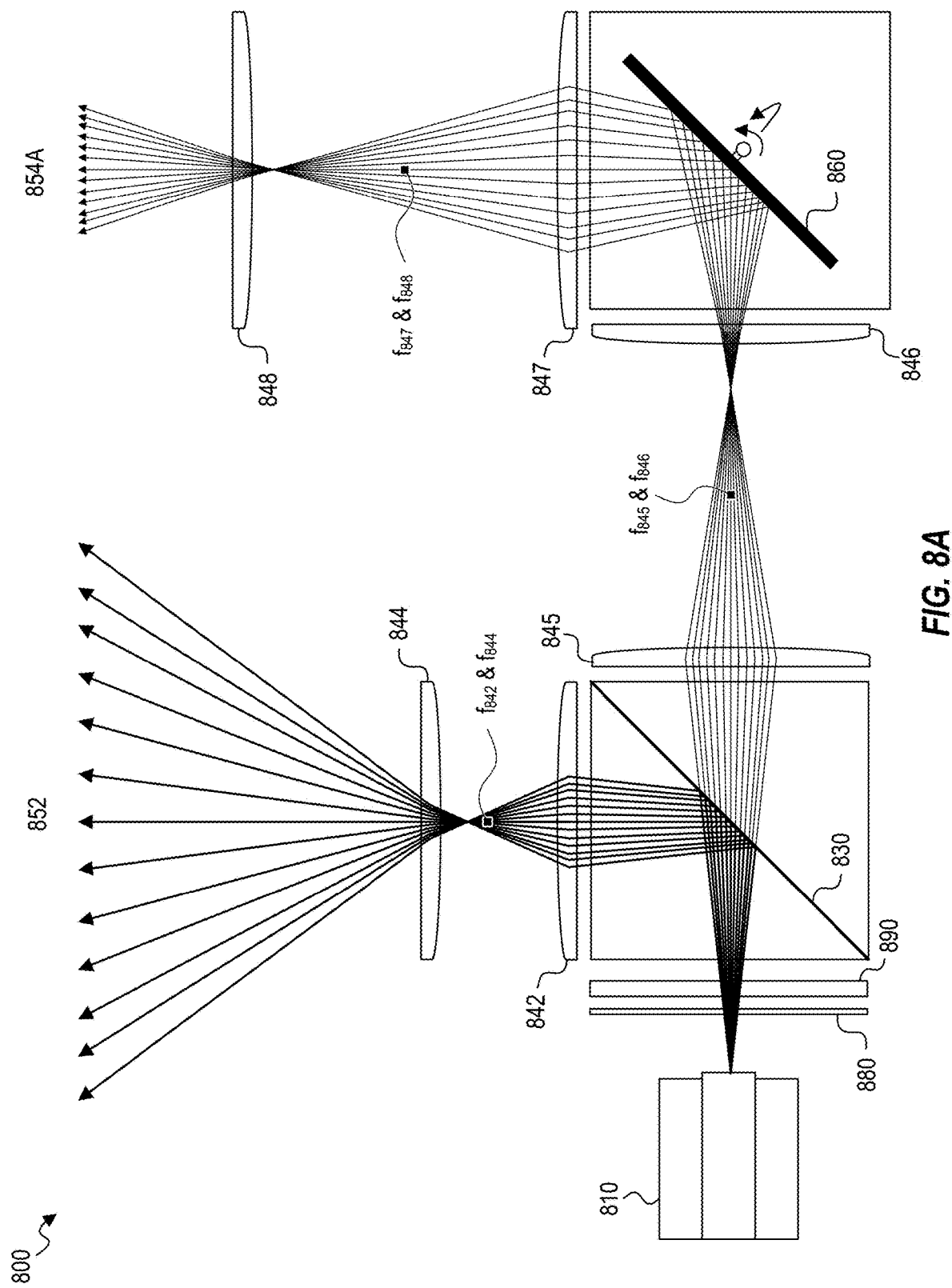
FIGS. 8A-8C illustrate schematically a display system according to some other embodiments of the present invention.
Figure 8B:
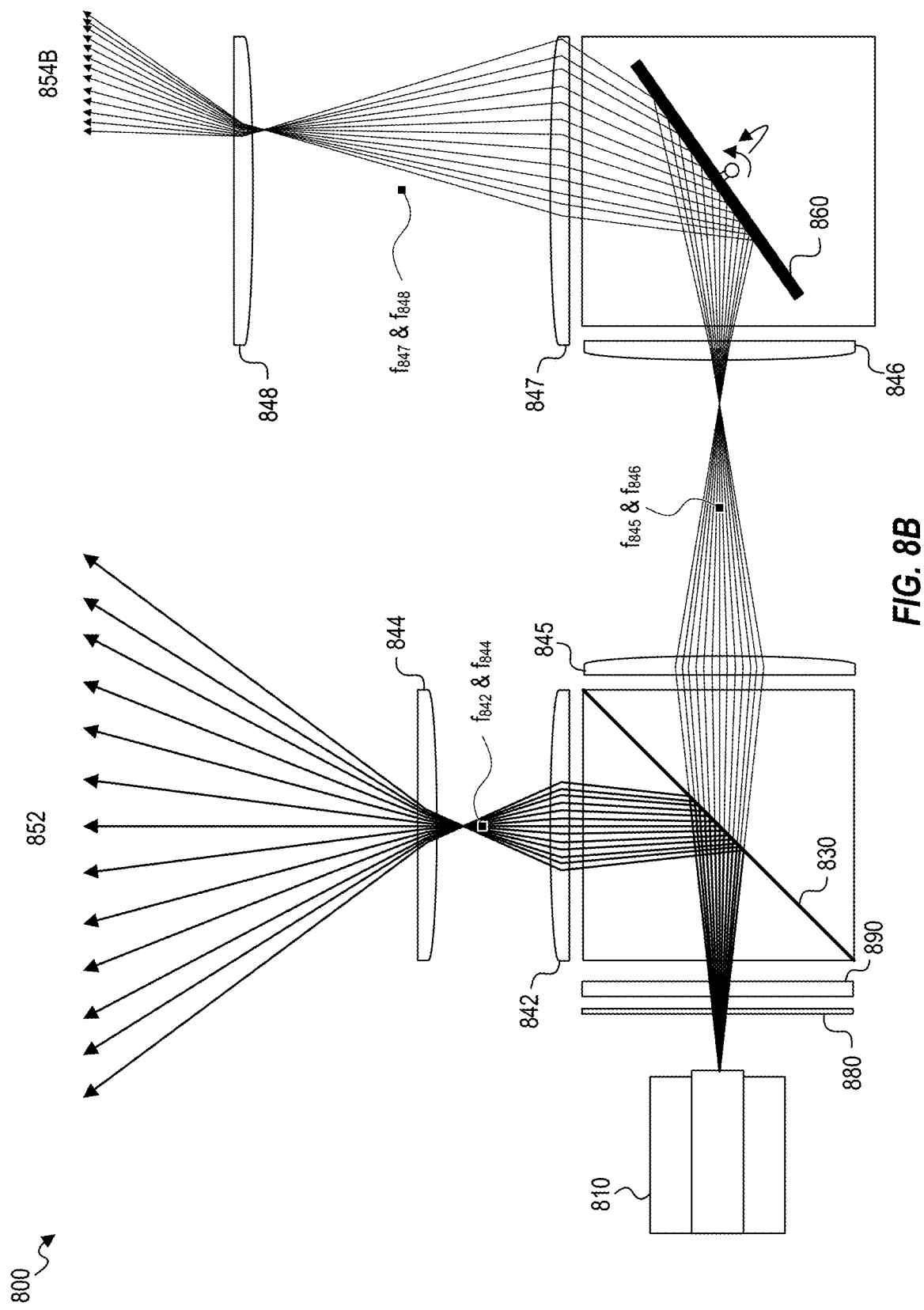
Figure 8C:
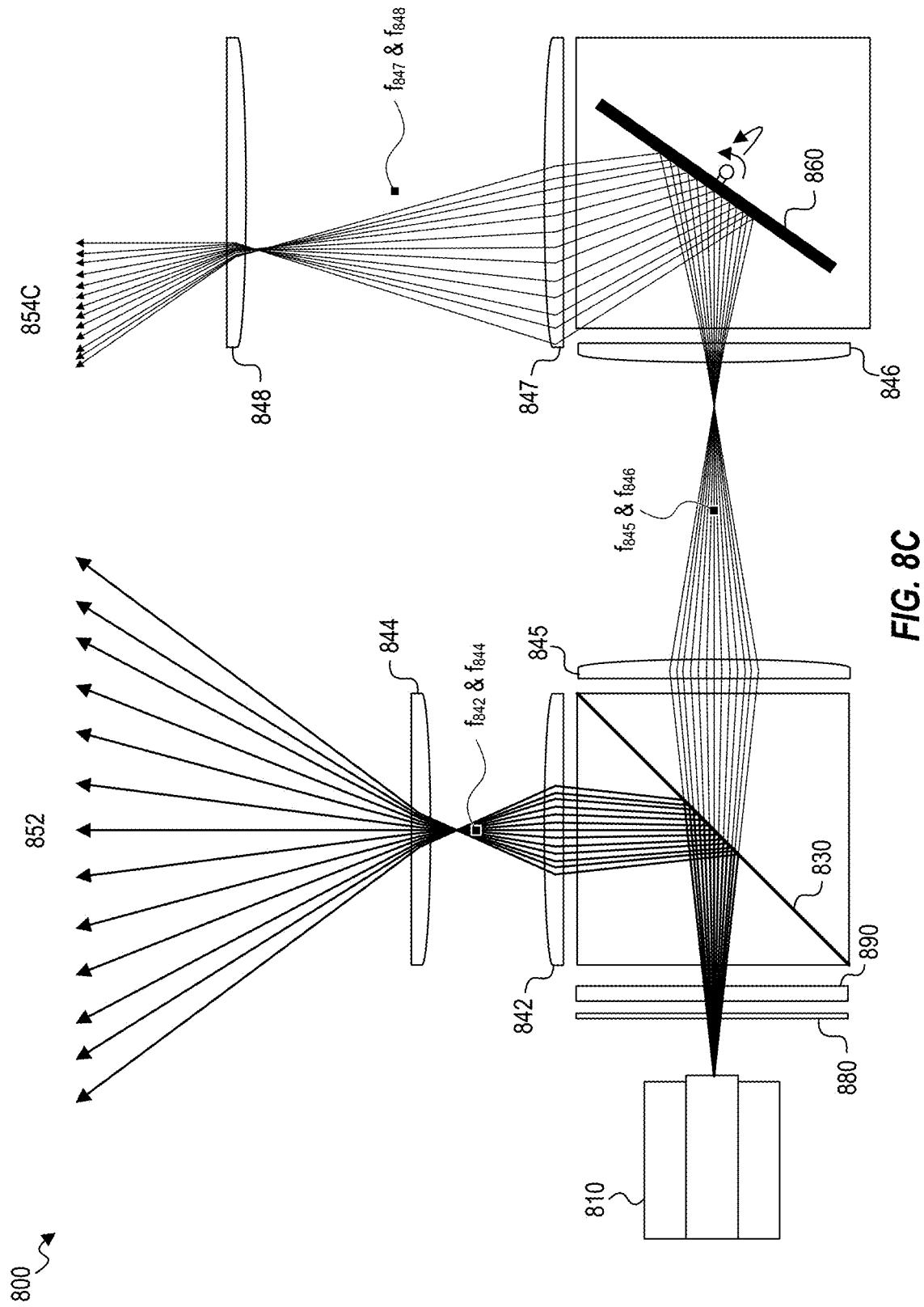

FIGS. 8A-8C illustrate schematically a display system 800 according to some other embodiments of the present invention. The display system 800 includes an image source 810, a beam splitter 830, a first optical lens 842, a second optical lens 844, a third optical lens 845, a fourth optical lens 846, a fifth optical lens 847, a sixth optical lens 848, a scanning mirror 860, a polarizer 880 and a switching polarization rotator 890. These components allow the projector to input light into a display from multiple image sources to help produce a composite image at the display that contains imagery with varying resolutions.

More specifically, FIGS. 8A-8C illustrate a display system 800 in each of three different stages. In each of the three stages, the image source 810, which can be coupled to a temple of a wearable display device, can output a range of angular light field components representative of virtual content as would be captured from the perspective of a head-tracked virtual camera and a range of angular light field components representative of virtual content as would be captured from the perspective of a fovea-tracked virtual camera. The two sets of angular light field components may, for instance, be time-division multiplexed, polarization-division multiplexed, wavelength-division multiplexed, or the like. As such, the angular light field components associated with the head-tracked virtual camera can be diverted upward by the polarization beam splitter 830 along a first optical path through the first and second optical lenses 842 and 844, and the angular light field components associated with the fovea-tracked virtual camera can pass through the polarization beam splitter 830 along a second optical path through third and fourth optical lenses 845 and 846 toward the scanning mirror 860 and reflected upward through fifth and sixth optical lenses 847 and 848.

The virtual content represented by the angular light field components associated with the head-tracked virtual camera may be rendered upstream from the image source 810 at a relatively low resolution, while the virtual content represented by the angular light field components associated with the fovea-tracked virtual camera may be rendered upstream from the image source 810 at a relatively high resolution. And, as shown in FIGS. 8A-8C, the display system 800 may be configured to output the angular light field components associated with the head-tracked render perspective and the angular light field components associated with the fovea-tracked render perspective as high FOV and low FOV light fields, respectively. In each of FIGS. 8A-8C, the light field components that propagate along the first optical path are output by the display system 800 as a relatively wide cone of light 852.

In the stage depicted in FIG. 8A, the scanning mirror 860 is in a first position. As such, it can be seen that the light field components that pass through the polarization beam splitter 830 and propagate along the second optical path are output by the display system 800 as a relatively narrow cone of light 854A spanning a substantially central region of angular space. Within the context of the examples described above with reference to FIGS. 6-7, the display system 800 could, for instance, place the scanning mirror 860 in the first position shown in FIG. 8A when the user's eye is oriented in a manner similar to that of the viewer's eye 602 in FIG. 6. In this way, the light components 854A may represent virtual content in a relatively centralized region of render space, such as virtual object 612. Further to the examples of FIGS. 6-7, the relatively wide cone of light 852 may, for instance, include virtual content in off-centered regions of render space, such as virtual objects 611 and 613. In some examples, the relatively wide cone of light 852 may further include light components that represent the same virtual content as is represented by the light components 854A, but in lower resolution.

In the stage depicted in FIG. 8B, the scanning mirror 860 is in a second position different from the first position. As such, it can be seen that the light field components that pass through the polarization beam splitter 830 and propagate along the second optical path are output by the display system 800 as a relatively narrow cone of light 854B spanning one substantially off-centered region of angular space. Within the context of the examples described above with reference to FIGS. 6-7, the display system 800 could, for instance, place the scanning mirror 860 in the second position shown in FIG. 8B when the user's eye is oriented in a manner similar to that of the viewer's eye 602 while the viewer is looking at virtual object 611. In this way, the light components 854B may represent virtual content in one relatively off-centered region of render space, such as virtual object 611. Further to the examples of FIGS. 6-7, the relatively wide cone of light 852 may, for instance, include virtual content in the other off-centered region of render space, such as virtual object 613, as well as virtual content in the centralized region of render space, such as virtual object 612. In some examples, the relatively wide cone of light 852 may further include light components that represent the same virtual content as is represented by the light components 854B, but in lower resolution.

In the stage depicted in FIG. 8C, the scanning mirror 860 is in a third position different from the first and second positions. As such, it can be seen that the light field components that pass through the polarization beam splitter 830 and propagate along the second optical path are output by the display system 800 as a relatively narrow cone of light 854C spanning another, different substantially off-centered region of angular space. Within the context of the examples described above with reference to FIGS. 6-7, the display system 800 could, for instance, place the scanning mirror 860 in the second position shown in FIG. 8C when the user's eye is oriented in a manner similar to that of the viewer's eye 602 in FIG. 7. In this way, the light components 854C may represent virtual content in the other relatively off-centered region of render space, such as virtual object 613. Further to the examples of FIGS. 6-7, the relatively wide cone of light 852 may, for instance, include virtual content in the off-centered region of render space described above with reference to FIG. 8B, such as virtual object 611, as well as virtual content in the centralized region of render space, such as virtual object 612. In some examples, the relatively wide cone of light 852 may further include light components that represent the same virtual content as is represented by the light components 854C, but in lower resolution.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wearable display device, comprising:
a frame including an attachment member configured to secure the wearable display device to a head of a user; and
a display assembly coupled to the frame, the display assembly comprising:
a main display comprising one or more optical waveguides configured to project an angular representation of virtual content onto an eye of the user, wherein the main display has a first resolution, and wherein the main display is sized to at least partially cover a field of regard of the eye of the user; and
a peripheral display that borders and surrounds the main display and that has a second resolution that is lower than the first resolution, wherein the peripheral display includes a screen-based display that is configured to generate a spatial representation of the virtual content, and wherein the screen-based display of the peripheral display is in physical contact with the one or more optical waveguides of the main display.

2. The wearable display device as recited in claim 1, wherein a first region of the peripheral display shows content at a higher spatial resolution than a second region of the peripheral display and wherein the first region is closer to a user's field of regard than the second region.

3. The wearable display device as recited in claim 2, wherein pixels are spaced more closely together in the first region than in the second region.

4. The wearable display device as recited in claim 1, wherein the main display overlaps at least a portion of the peripheral display.

5. The wearable display device as recited in claim 1, wherein the main display comprises a first main display associated with a left eye of the user and a second main display associated with a right eye of the user, both the first and second main displays being coupled to a layer of the peripheral display.

6. A head-mounted display device, comprising:
a frame including an attachment member configured to secure the head-mounted display device to a head of a user; and
a display assembly coupled to the frame and configured to output virtual content toward an eye of the user, the display assembly comprising:
a first region having a first resolution, the first region comprising one or more optical waveguides configured to project an angular representation of the virtual content onto the eye of the user, wherein the first region is sized to at least partially cover a field of regard of the eye of the user;
a second region that at least partially borders and surrounds the first region and having a second resolution lower than the first resolution, wherein the second region includes a screen-based display that is configured to generate a spatial representation of the virtual content; and
a transition region between the first region and the second region having a variable resolution that is higher on a first side of the transition region adjacent to the first region than a second side of the transition region adjacent the second region, wherein the transition region is in physical contact with each of the first region and the second region.

7. The head-mounted display device as recited in claim 6, wherein the second region renders the virtual content in grayscale and the first region renders the virtual content in color.

8. The head-mounted display device as recited in claim 6, wherein a spatial resolution of the first region is greater than a spatial resolution of the second region.

9. The head-mounted display device as recited in claim 6, wherein the screen-based display is a transparent organic light emitting diode (OLED) display.

10. The head-mounted display device as recited in claim 6, further comprising a pico-projector configured to illuminate the first region by projecting content onto inner or outer surfaces of the display assembly.

11. The head-mounted display device as recited in claim 6, wherein the second region is sized to fill a gap between a periphery of the first region and a face of the user when the head-mounted display device is being worn.

12. The display assembly as recited in claim 6, wherein the second region has a larger curvature than the first region.

13. A wearable display device, comprising:
   a frame;
   a projector coupled to the frame; and
   a display assembly, comprising:
      a main display coupled to the frame and comprising one or more optical waveguides configured to project an angular representation of virtual content onto an eye of a user, wherein the main display has a first resolution, and wherein the main display is sized to at least partially cover a field of regard of the eye of the user, and
      a peripheral display that at least partially borders and surrounds the main display and that has a second resolution that is lower than the first resolution, wherein the peripheral display includes a screen-based display that is configured to output a spatial representation of the virtual content, wherein the screen-based display of the peripheral display is in physical contact with the one or more optical waveguides of the main display.

14. The wearable display device as recited in claim 13, further comprising temples configured to attach the wearable display device to the user and to rotate with respect to the frame,
   wherein the peripheral display is configured to bend and flex to accommodate rotation of the temples with respect to the frame.

15. The wearable display device as recited in claim 13, wherein a portion of the peripheral display is positioned between a portion of an attachment member and the user of the wearable display device when the wearable display device is being worn by the user.

16. The wearable display device as recited in claim 13, further comprising a camera configured to monitor the user's surroundings, wherein the peripheral display is configured to display the user's surroundings over one or more optically opaque portions of the frame.

17. The wearable display device as recited in claim 13, wherein the peripheral display is optically coupled to one or more optical components positioned along at least one side of the main display.

* * * * *